United States Patent [19]

Ishikawa et al.

[11] Patent Number: 5,926,297
[45] Date of Patent: Jul. 20, 1999

[54] OPTICAL MODULATING DEVICE AND OPTICAL MODULATING METHOD

[75] Inventors: George Ishikawa; Hiroshi Nishimoto; Hiroki Ooi, all of Kawasaki, Japan

[73] Assignee: Fujitsu Limited, Kawasaki, Japan

[21] Appl. No.: 08/828,694

[22] Filed: Mar. 31, 1997

[30] Foreign Application Priority Data

Sep. 3, 1996 [JP] Japan .................................. 8-233469

[51] Int. Cl.[6] .......................... H04J 14/00; H04B 10/04; H04B 10/02; H04B 10/00
[52] U.S. Cl. ......................... 359/115; 359/115; 359/135; 359/158; 359/181; 359/187; 359/177
[58] Field of Search ................... 359/135, 137, 359/158, 187, 181, 177

[56] References Cited

U.S. PATENT DOCUMENTS 5,020,872 6/1991 DuPuy et al. ..................... 350/96.14
5,522,004 5/1996 Djupsjobacka et al. ................ 385/123
5,726,789 3/1998 Horiuchi et al. ........................ 359/184
5,805,328 9/1998 Satoh et al. ............................ 359/245

Primary Examiner—Jason Chan
Assistant Examiner—Mohammad Sedighian
Attorney, Agent, or Firm—Staas & Halsey

[57] ABSTRACT

An optical modulating method and an optical modulating device for optical time division multiplexing (OTDM). The optical modulating device comprises, for example, an optical switch for generating first and second optical clocks according to a carrier beam output from a light source, optical modulators for respectively switching on/off the optical clocks by data signals to thereby generate first and second signal beams, an optical multiplexer for combining the signal beams to generate an OTDM signal, and prechirp circuit for controlling, for example, the optical clocks so that the OTDM signal has a chirp parameter adapted to an optical transmission line. This optical modulation device is suitable for high-speed transmission and allows chromatic compensation.

31 Claims, 31 Drawing Sheets

F I G. 3A 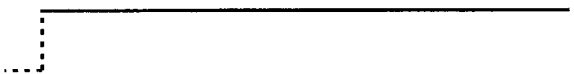
F I G. 3B 
F I G. 3C 
F I G. 3D 
F I G. 3E 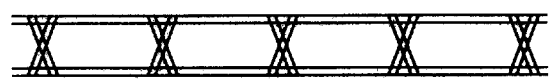
F I G. 3F 
F I G. 3G 
F I G. 3H 
F I G. 3I 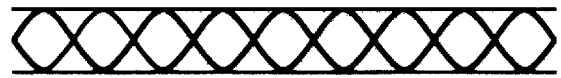

RED SHIFT
$\alpha > 0$

BLUE SHIFT
$\alpha < 0$

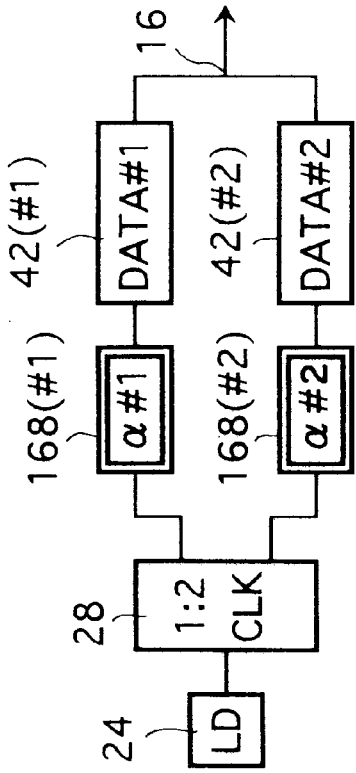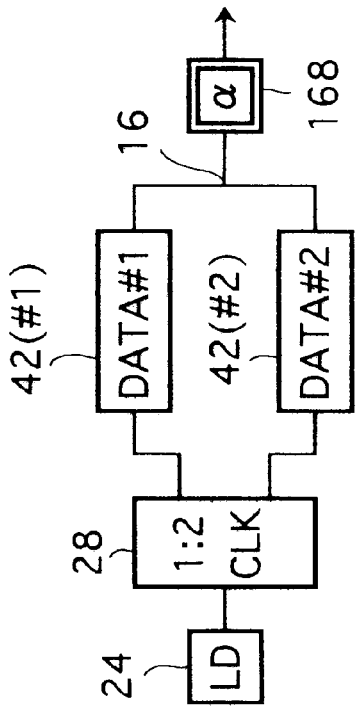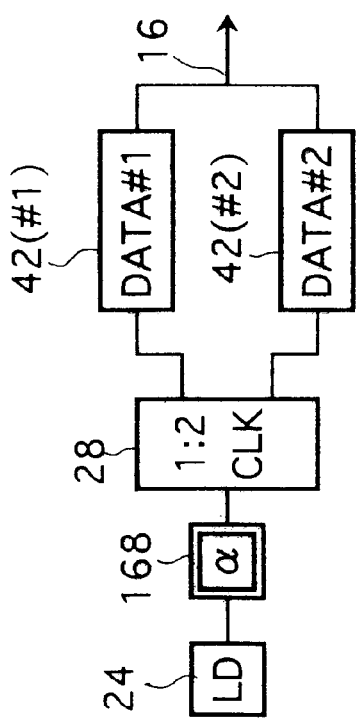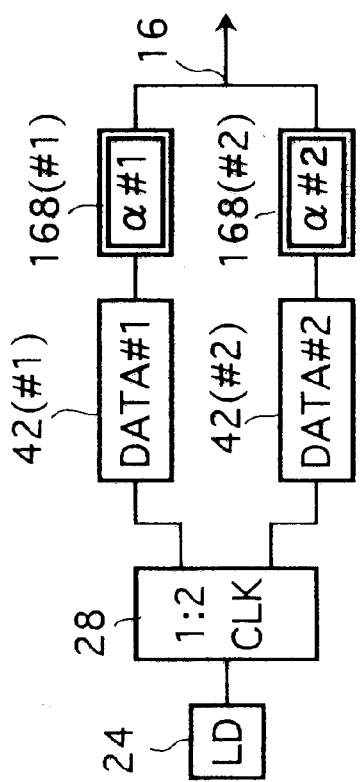
FIG. 23A
FIG. 23B
FIG. 23C
FIG. 23D

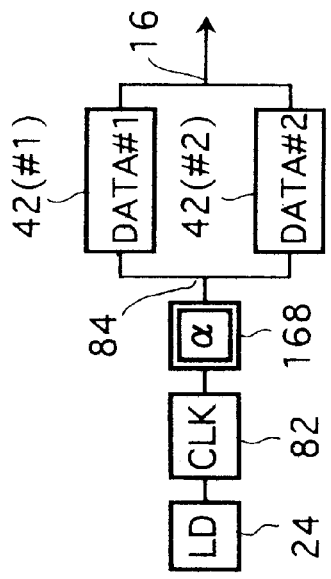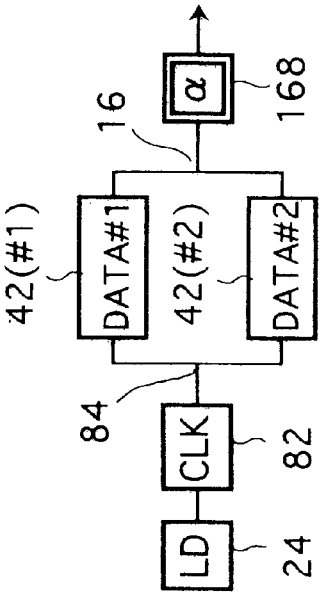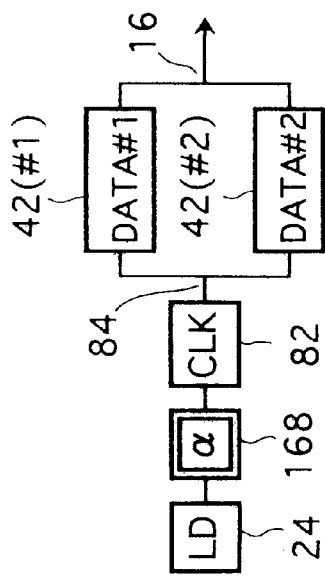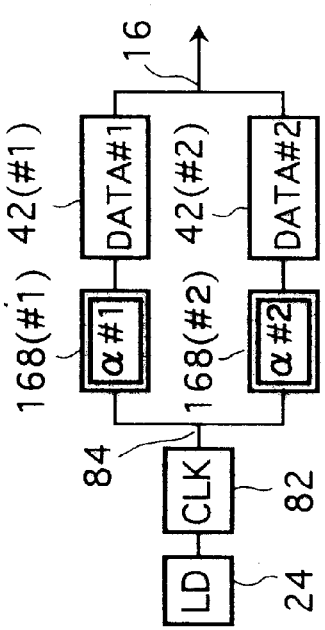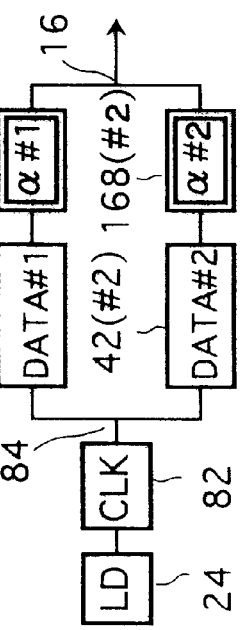

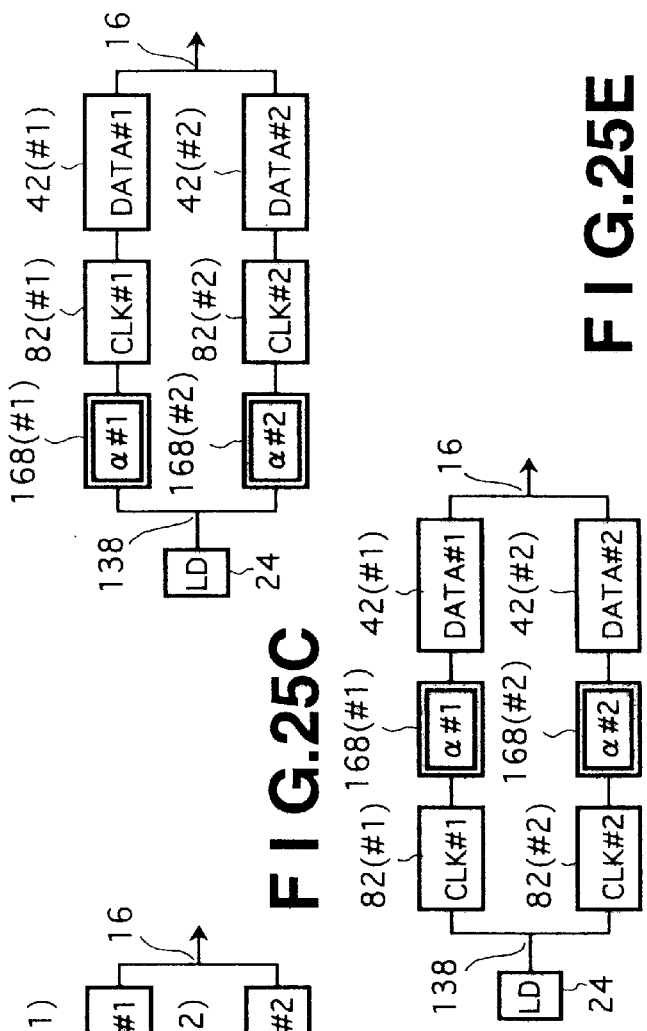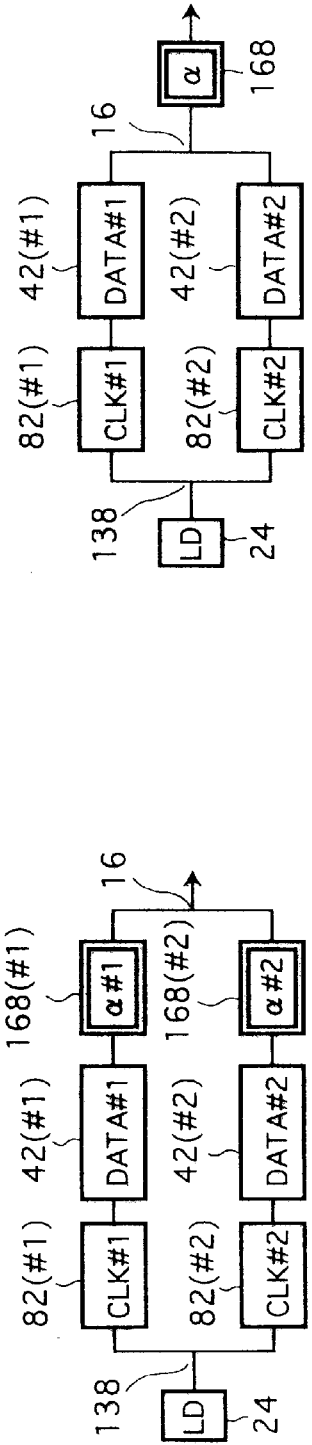

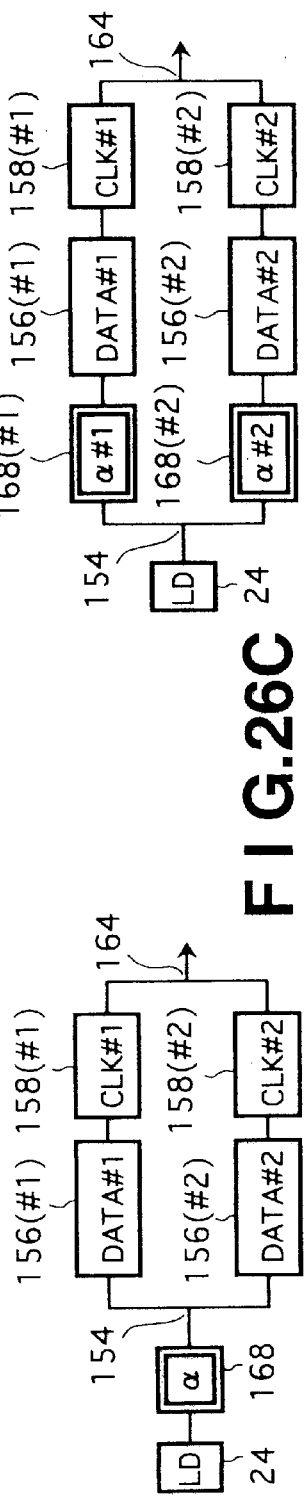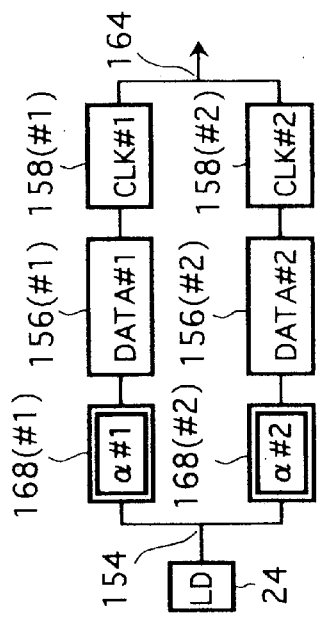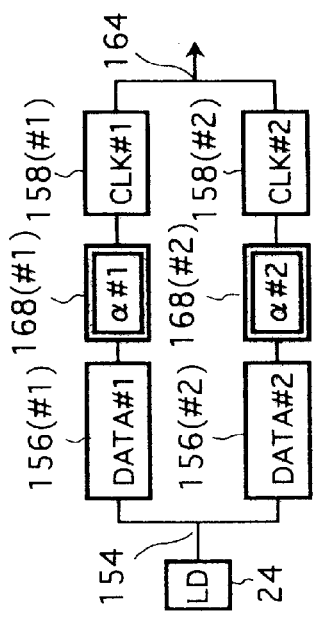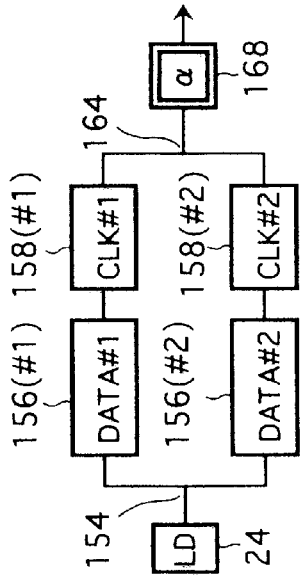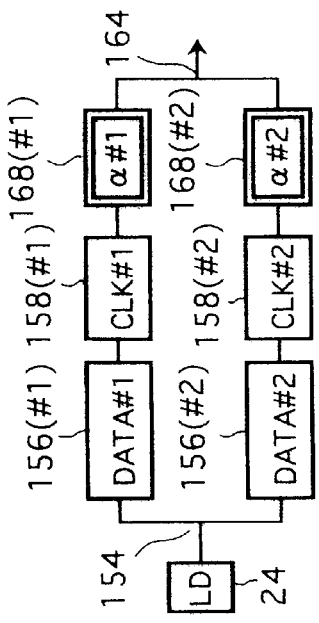

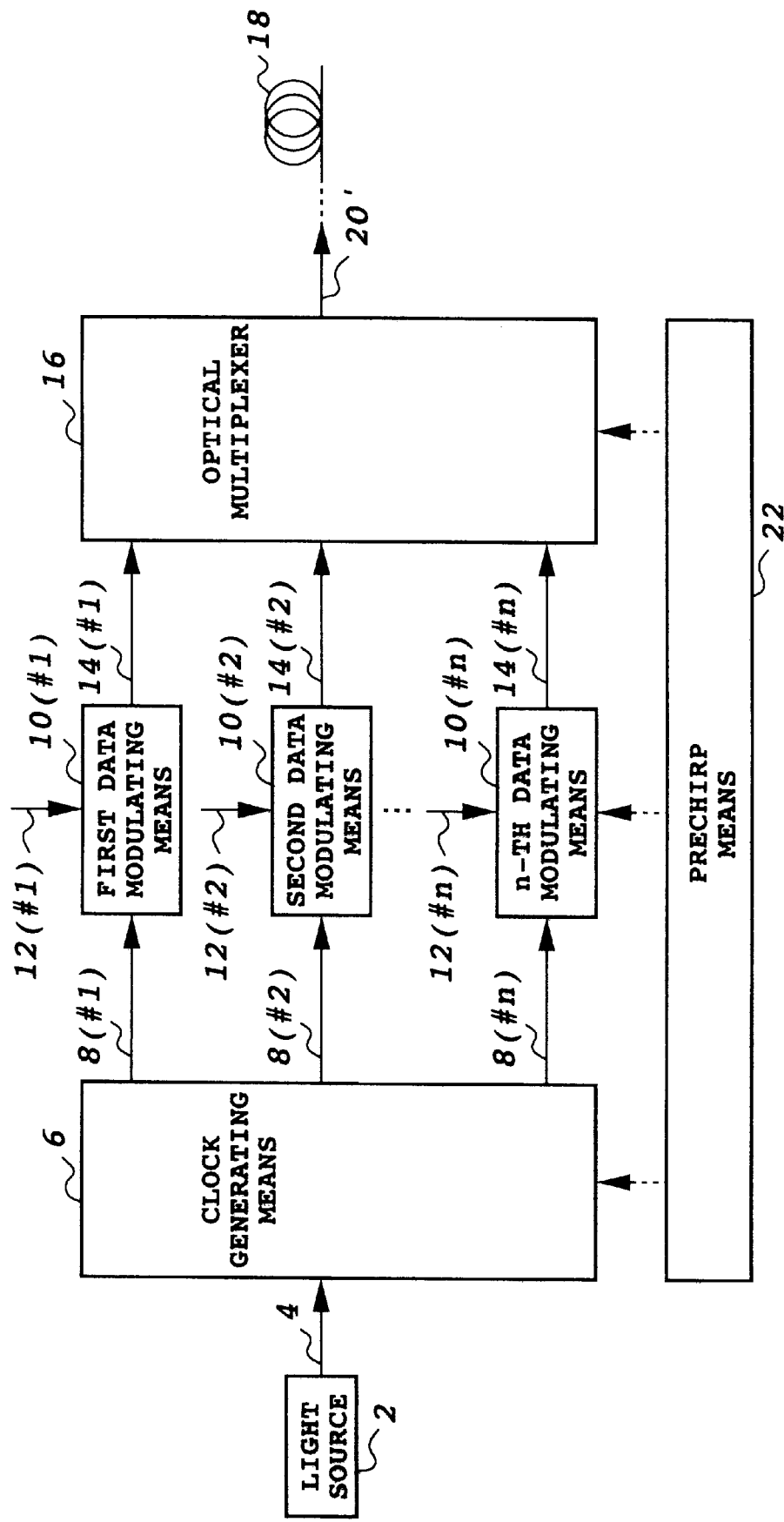

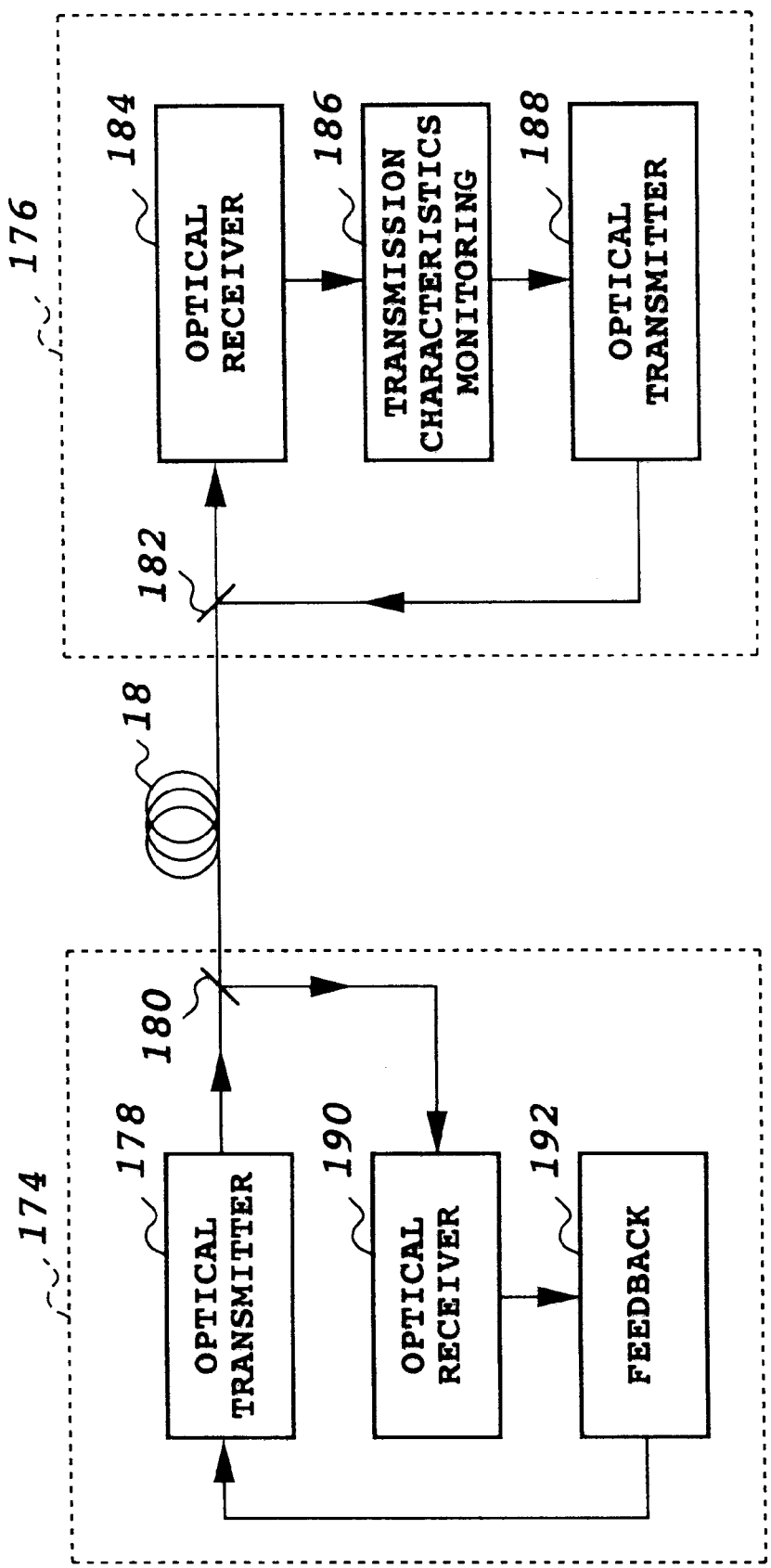

OPTICAL MODULATING DEVICE AND OPTICAL MODULATING METHOD

BACKGROUND OF THE INVENTION

1. Field of the Invention

The present invention relates to an optical modulating device and an optical modulating method.

2. Description of the Related Art

At present, an optical communication system at a transmission rate of 10 Gb/s is being put to practical use on one hand, and a larger capacity is desired for realization of a future multimedia network on the other hand. As a technique for response to this desire, increasing a transmission rate by optical time division multiplexing (OTDM) is now expected to be promising. To speed up a system adopting OTDM, the following two significant requirements must be met.

(1) Establishment of a high-speed optical modulation/demodulation technique.

(2) Overcoming of limitation of a transmission distance due to chromatic dispersion, self-phase modulation effect, and polarization dispersion.

For the first requirement, speeding up and ensuring of reliability of optical devices and electronic devices are essential. For example, research and development are now pursued on electronic devices operating at 10 to 40 Gb/s by using Si, GaAs, HBT, HEMT, etc. However, it is said that a presently practical level of operating speed is up to 10 Gb/s. As a method for compensating for limitation of the operating speed of the electronic devices, multiplexing/demultiplexing in an optical region (optical MUX/DEMUX) is effective.

With regard to the second requirement mentioned above, waveform degradation due to group-velocity dispersion (GVD) in an optical fiber becomes remarkable with an increase in transmission rate. Further, when optical power for transmission is increased to ensure a required optical SNR at a receiving end, the effect of self-phase modulation (SPM) as one of nonlinear effects in an optical fiber becomes profound. As a result, waveform degradation becomes more complicated because of the interaction of GVD and SPM (SPM-GVD effect). To suppress this waveform degradation and ensure a transmission distance, a chromatic dispersion to an optical signal must be set as small as possible. In the case that the waveform degradation due to the SPM-GVD effect is predominant, a scaling law as expressed below substantially holds.

$$DB^2 P_{av} L^2 = \text{const.} \quad (1)$$

where D is the dispersion (ps/nm/km), B is the transmission rate (b/s), $P_{av}$ is the average optical power (mW) in a transmission line, and L is the transmission distance (km). For example, when the transmission rate B is intended to increase four times from 10 Gb/s to 40 Gb/s, the average optical power $P_{av}$ in the transmission line must be increased four times. Therefore, the allowable dispersion to ensure the same transmission distance L becomes a very exacting value of 1/64.

Most of optical fiber transmission lines presently laid are 1.3 μm zero-dispersion single mode fibers (SMF). In the case of using the single mode fiber at 1.55 μm which is a band of an erbium doped fiber amplifier (EDFA), it is essential to apply any dispersion compensation technique.

Another method of newly laying a 1.55 μm dispersion shifted fiber (DSF) is considered. However, longitudinal variations in zero dispersion wavelength $\lambda_0$ are not avoidable in view of a fabrication technique for the fiber. At transmission rates over 10 Gb/s, waveform degradation due to the longitudinal variations in zero dispersion wavelength $\lambda_0$ is not negligible, and a technique of compensating for such waveform degradation must be introduced.

SUMMARY OF THE INVENTION

It is therefore an object of the present invention to provide an optical modulating device and an optical modulating method which is suitable for high-speed transmission and allows dispersion compensation.

According to the present invention, OTDM for high-speed transmission and prechirping for dispersion compensation are combined to carry out optical modulation, so as to meet the first and second requirements mentioned above.

In accordance with a first aspect of the present invention, clock generating means generates first and second optical clocks according to a carrier beam from a light source. First data modulating means switches on/off the first optical clock by a first data signal synchronous with the first optical clock to thereby generate a first signal beam. Second data modulating means switches on/off the second optical clock by a second data signal synchronous with the second optical clock to thereby generate a second signal beam. The first and second signal beams are combined by an optical multiplexer to thereby generate an optical time division multiplexed signal. At least one of the carrier beam, the first and second optical clocks, the first and second signal beams, and the optical time division multiplexed signal is controlled by prechirp means so that the optical time division multiplexed signal has a chirp parameter adapted to an optical transmission line.

In the case that the first and second optical clocks have pulse widths smaller than those of the first and second data signals, the first and second optical clocks are predominant for the chirp parameter of the optical time division multiplexed signal. Accordingly, in this case, the prechirp means preferably controls the first and second optical clocks.

In accordance with a second aspect of the present invention, there is provided an optical modulating device comprising means for outputting first and second carrier beams according to a carrier beam from a light source; means for receiving said first carrier beam and switching on/off said first carrier beam by a first data signal to thereby generate a first data modulated beam; means for receiving said second carrier beam and switching on/off said second carrier beam by a second data signal to thereby generate a second data modulated beam; optical multiplexing means for applying first and second optical clocks to said first and second data modulated beams, respectively, to generate first and second signal beams and combining said first and second signal beams to generate an optical time division multiplexed signal; and means for controlling at least one of said carrier beam, said first and second carrier beams, said first and second data modulated beams, said first and second signal beams, and said optical time division multiplexed signal so that said optical time division multiplexed signal has a predetermined chirp parameter.

In accordance with a third aspect of the present invention, there is provided an optical modulating device comprising clock generating means for generating first to n-th (n is an integer greater than 2) optical clocks according to a carrier beam from a light source; data modulating means for receiving a k-th (k is an integer satisfying $1 \leq k \leq n$) optical clock and switching on/off said k-th optical clock by a k-th data signal synchronous with said k-th optical clock to thereby generate a k-th signal beam; an optical multiplexer operatively connected to said data modulating means and an optical transmission line, for generating an optical time division multiplexed signal according to first to n-th signal beams generated from said data modulating means; and means for controlling at least one of said carrier beam, said optical clocks, said signal beams, and said optical time division multiplexed signal so that said optical time division multiplexed signal has a chirp parameter adapted to said optical transmission line.

In accordance with a fourth aspect of the present invention, there is provided an optical modulating method comprising the steps of (a) generating first and second optical clocks according to a carrier beam from a light source; (b) switching on/off said first optical clock by a first data signal synchronous with said first optical clock to thereby generate a first signal beam; (c) switching on/off said second optical clock by a second data signal synchronous with said second optical clock to thereby generate a second signal beam; (d) combining said first and second signal beams to generate an optical time division multiplexed signal; and (e) controlling at least one of said carrier beam, said first and second optical clocks, said first and second signal beams, and said optical time division multiplexed signal so that said optical time division multiplexed signal has a predetermined chirp parameter.

In this specification, the wording that an element and another element are operatively connected includes the case that these elements are directly connected, and also includes the case that these elements are so provided as to be related with each other to such an extent that an electrical signal or an optical signal can be mutually transferred between these elements.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 3A to 3I are time charts showing the operation of the device shown in FIG. 2;

FIGS. 23A to 23D are block diagrams showing various arrangements of a chirping addition circuit applicable in FIG. 2;

FIGS. 24A to 24E are block diagrams showing various arrangements of a chirping addition circuit applicable in FIG. 11;

FIGS. 25A to 25E are block diagrams showing various arrangements of a chirping addition circuit applicable in FIG. 19;

FIGS. 26A to 26E are block diagrams showing various arrangements of a chirping addition circuit applicable in FIG. 21;

FIG. 28 is a block diagram showing a third basic configuration of the optical modulating device according to the present invention;

FIG. 31 is a block diagram showing an optical communication system to which the present invention is applicable.

DETAILED DESCRIPTION OF THE PREFERRED EMBODIMENTS

Some preferred embodiments of the present invention will now be described in detail with reference to the attached drawings.

Figure 1:
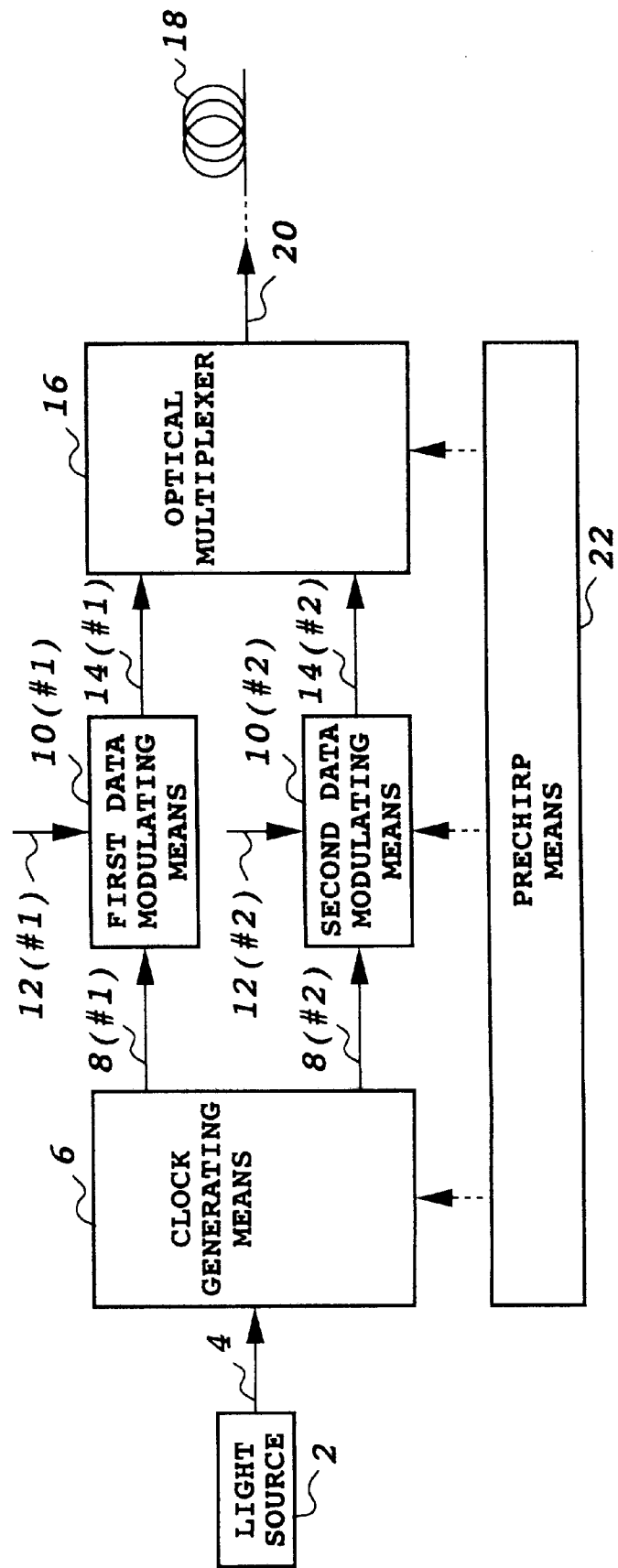
FIG. 1 is a block diagram showing a first basic configuration of the optical modulating device according to the present invention.

Referring to FIG. 1, there is shown a first basic configuration of the optical modulating device according to the present invention. This device performs intensity modulation on a carrier beam 4 as continuous wave light (CW light) output from a light source 2. Further, this device is configured by only an assembly having an operating speed corresponding to the half of a bit rate of an optical signal to be finally obtained.

Clock generating means 6 generates a first optical clock 8 (#1) and a second optical clock 8 (#2) according to the carrier beam 4. The optical clocks 8 (#1 and #2) are supplied to first data modulating means 10 (#1) and second data modulating means 10 (#2), respectively. The data modulating means 10 (#1) switches on/off the optical clock 8 (#1) by receiving a first data signal 12 (#1) synchronous with the optical clock 8 (#1) to thereby generate a first signal beam 14 (#1). The data modulating means 10 (#2) switches on/off the optical clock 8 (#2) by receiving a second data signal 12 (#2) synchronous with the optical clock 8 (#2) to thereby generate a second signal beam 14 (#2). An optical multiplexer 16 is operatively connected to the data modulating means 10 (#1 and #2) and an optical transmission line 18. The optical multiplexer 16 combines the signal beams 14 (#1 and #2) to generate an optical time division multiplexed signal (OTDM signal) 20. The OTDM signal 20 is transmitted through the optical transmission line 18 to an optical repeater or an optical receiver (both not shown).

Prechirp means 22 is provided to make the OTDM signal 20 have a chirp parameter adapted to the optical transmission line 18. The prechirp means 22 controls at least one of the carrier beam 4, the optical clocks 8 (#1 and #2), the signal beams 14 (#1 and #2), and the OTDM signal 20 so that the OTDM signal 20 has a predetermined chirp parameter.

Figure 2:
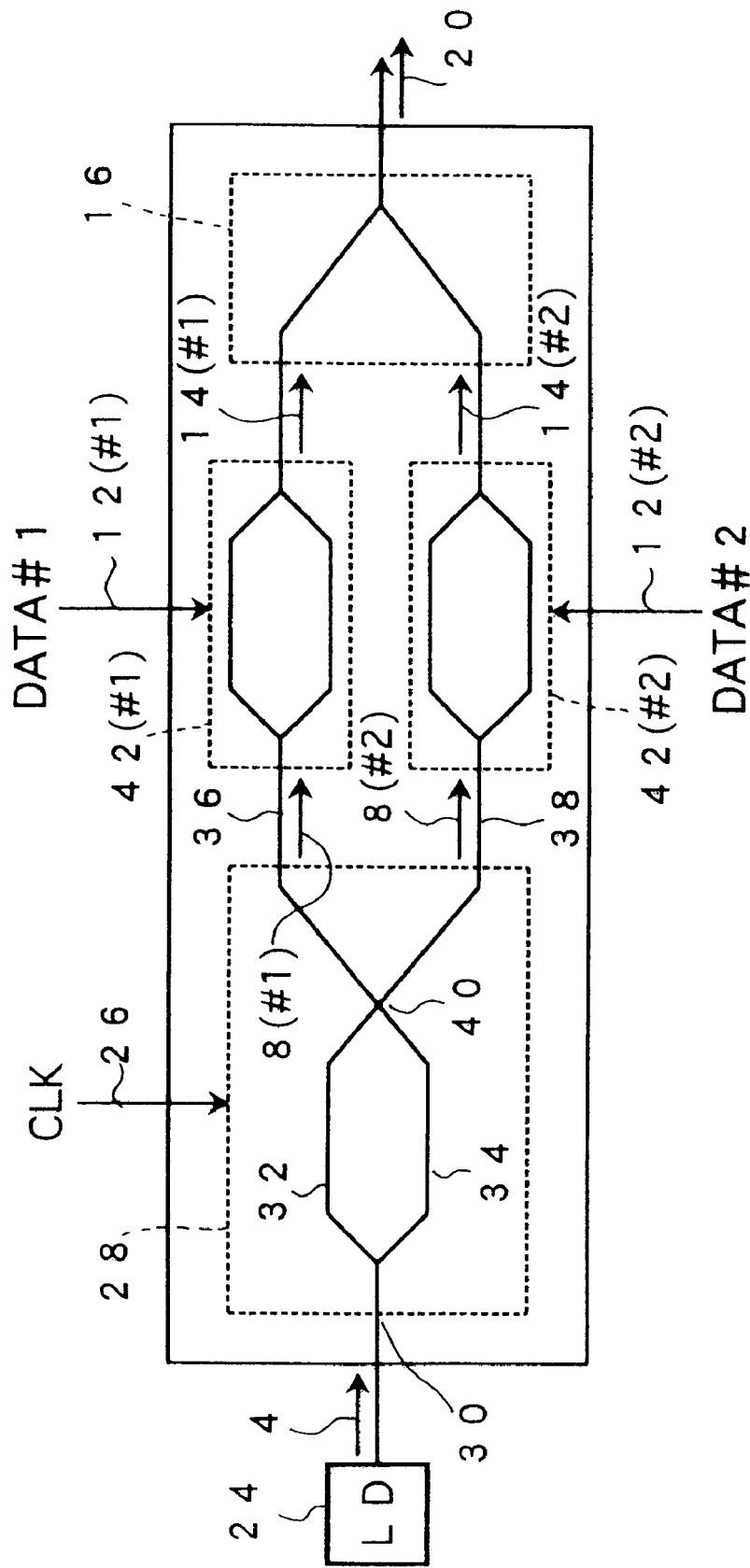
FIG. 2 is a block diagram showing a first preferred embodiment of the first basic configuration.
Figure 4A:
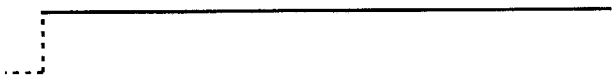
FIGS. 4A to 4I are other time charts showing the operation of the device shown in FIG. 2.
Figure 4B:
Figure 4C:
Figure 4D:
Figure 4E:
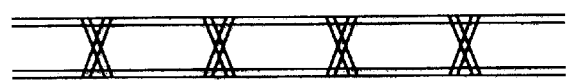
Figure 4F:
Figure 4G:
Figure 4H:
Figure 4I:

Referring to FIG. 2, there is shown a first preferred embodiment of the first basic configuration. Throughout the drawings, substantially the same parts are denoted by the same reference numerals.

A laser diode (LD) 24 is used as the light source 2, and the clock generating means 6 includes a balanced bridge type 1×2 optical switch 28 operated by a 20 GHz clock (CLK) 26, for example. The 1×2 optical switch 28 has an input port 30 operatively connected to the LD 24, a first optical path 32 and a second optical path 34 branched from the input port 30, a first output port 36 and a second output port 38 for respectively outputting the optical clocks 8 (#1 and #2), and an intersecting type optical coupler 40 provided between the optical paths 32 and 34 and the output ports 36 and 38. Mach-Zehnder type optical modulators 42 (#1 and #2) are used as the data modulating means 10 (#1 and #2), respectively. A Y-branch is used as the optical multiplexer 16.

FIGS. 3A to 3I are time charts showing the operation of the device shown in FIG. 2.

FIG. 3A shows a waveform of the carrier beam 4 supplied to the input port 30. The carrier beam 4 has a constant intensity (amplitude).

FIG. 3B shows a waveform of the clock 26 supplied to the optical switch 28. The clock 26 is a sine wave in this preferred embodiment.

FIGS. 3C and 3D show waveforms of the first optical clock 8 (#1) and the second optical clock 8 (#2) obtained according to the clock 26, respectively. The optical clocks 8 (#1 and #2) have sinusoidal-like waveforms complementary to each other. That is, a phase difference between the optical clocks 8 (#1 and #2) is π.

FIG. 3E shows a waveform of the first data signal 12 (#1) supplied to the optical modulator 42 (#1). The first data signal 12 (#1) is synchronous with the first optical clock 8 (#1). The first data signal 12 (#1) is preliminarily NRZ-coded at 20 Gb/s, for example.

FIG. 3F shows a waveform of the second data signal 12 (#2) supplied to the optical modulator 42 (#2). The second data signal 12 (#2) is synchronous with the second optical clock 8 (#2). The second data signal 12 (#2) is preliminarily NRZ-coded at 20 Gb/s, for example.

FIG. 3G shows a waveform of the first signal beam 14 (#1) output from the optical modulator 42 (#1). The first signal beam 14 (#1) is RZ-coded at 20 Gb/s by switching on/off the optical clock 8 (#1) according to the data signal 12 (#1).

FIG. 3H shows a waveform of the second signal beam 14 (#2) output from the optical modulator 42 (#2). The second signal beam 14 (#2) is RZ-coded at 20 Gb/s by switching on/off the optical clock 8 (#2) according to the data signal 12 (#2). Since the optical clocks 8 (#1 and #2) are complementary to each other, a phase difference between the signal beams 14 (#1 and #2) is π.

FIG. 3I shows a waveform of the OTDM signal 20 output from the optical multiplexer 16. Since the phase difference between the signal beams 14 (#1 and #2) is π, the signal beams 14 (#1 and #2) are bit-multiplexed on a time axis without mutual collision, so that the OTDM signal 20 is RZ-coded at 40 Gb/s.

According to this preferred embodiment, the optical modulating device can be configured by only optical devices and electrical devices each with a band half the bit rate of the OTDM signal 20 to be finally obtained. Thus, a high-speed operation can be very easily attained.

The use of the sine wave as the clock 26 is due to the following two reasons. The first reason is that the band of a clock circuit can be reduced as compared with the case of using a rectangular wave as the clock. The second reason is that a relatively small pulse width can be obtained by using a sine wave near to an RZ code. In the case that the pulse width of the clock 26 is smaller than that of each of the data signals 12 (#1 and #2) as in this preferred embodiment, the chirp parameter of the OTDM signal 20 is determined by rising and falling of the optical clocks 8 (#1 and #2) in the optical switch 28. Accordingly, in this case, the chirp parameter is preferably set in the optical switch 28.

FIGS. 4A to 4I are other time charts showing the operation of the device shown in FIG. 2. FIGS. 4A to 4I correspond to FIGS. 3A to 3I, respectively. In this preferred embodiment, a rectangular wave is used as the clock 26. Also in this case, the OTDM signal 20 RZ-coded at 40 Gb/s can be obtained by using the NRZ-coded data signals 12 (#1 and #2) each having a pulse width larger than that of the optical clock.

In the first preferred embodiment shown in FIG. 2, all of the optical switch 28, the optical modulators 42 (#1 and #2), and the optical multiplexer 16 are monolithically integrated. That is, the optical modulating device is provided by configuring an optical waveguide structure with a predetermined pattern on a dielectric substrate formed of LiNbO3, for example.

Figure 5:
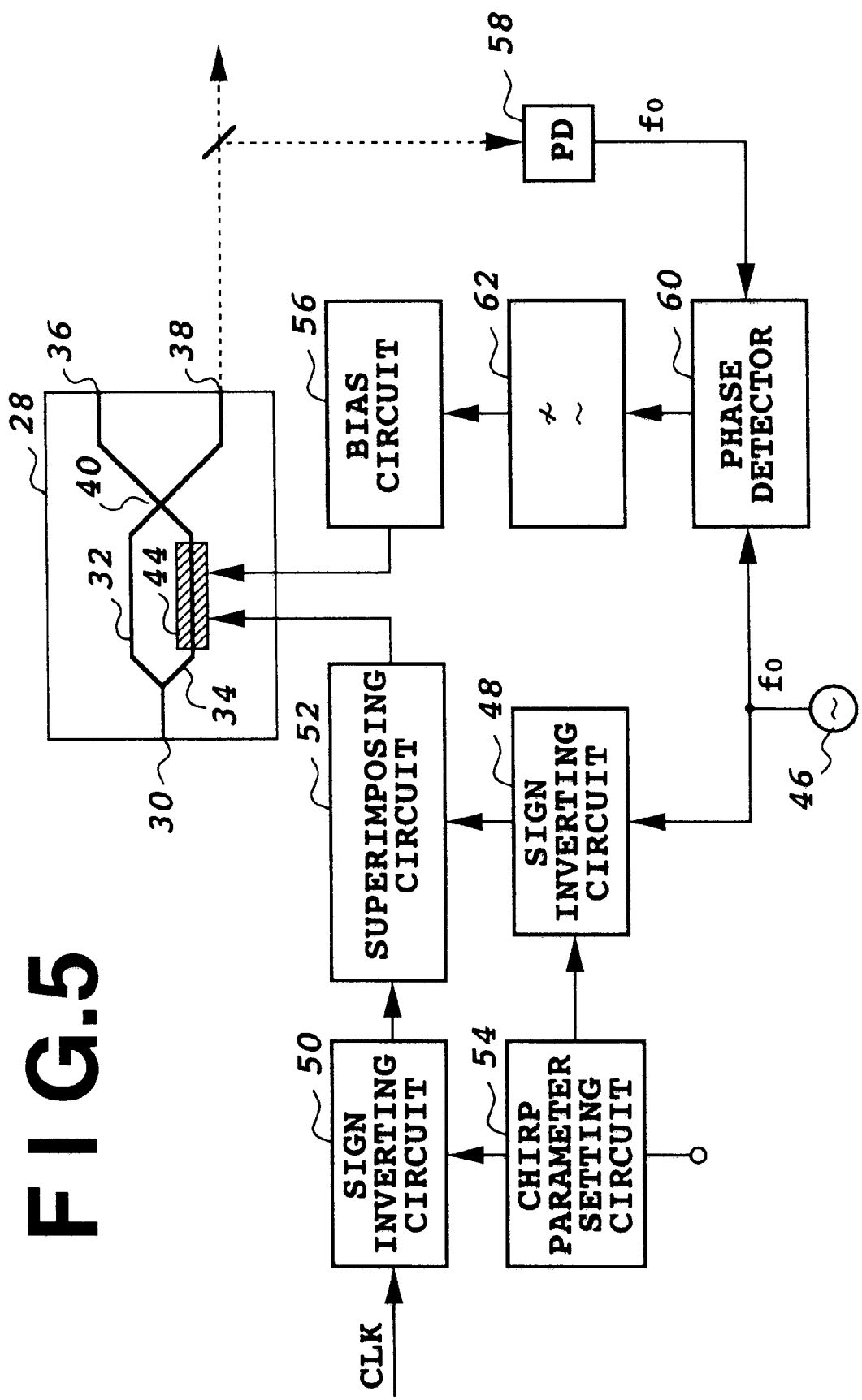
FIG. 5 is a block diagram showing a preferred embodiment of a drive circuit for a 1×2 optical switch shown in FIG. 2.
Figure 8:
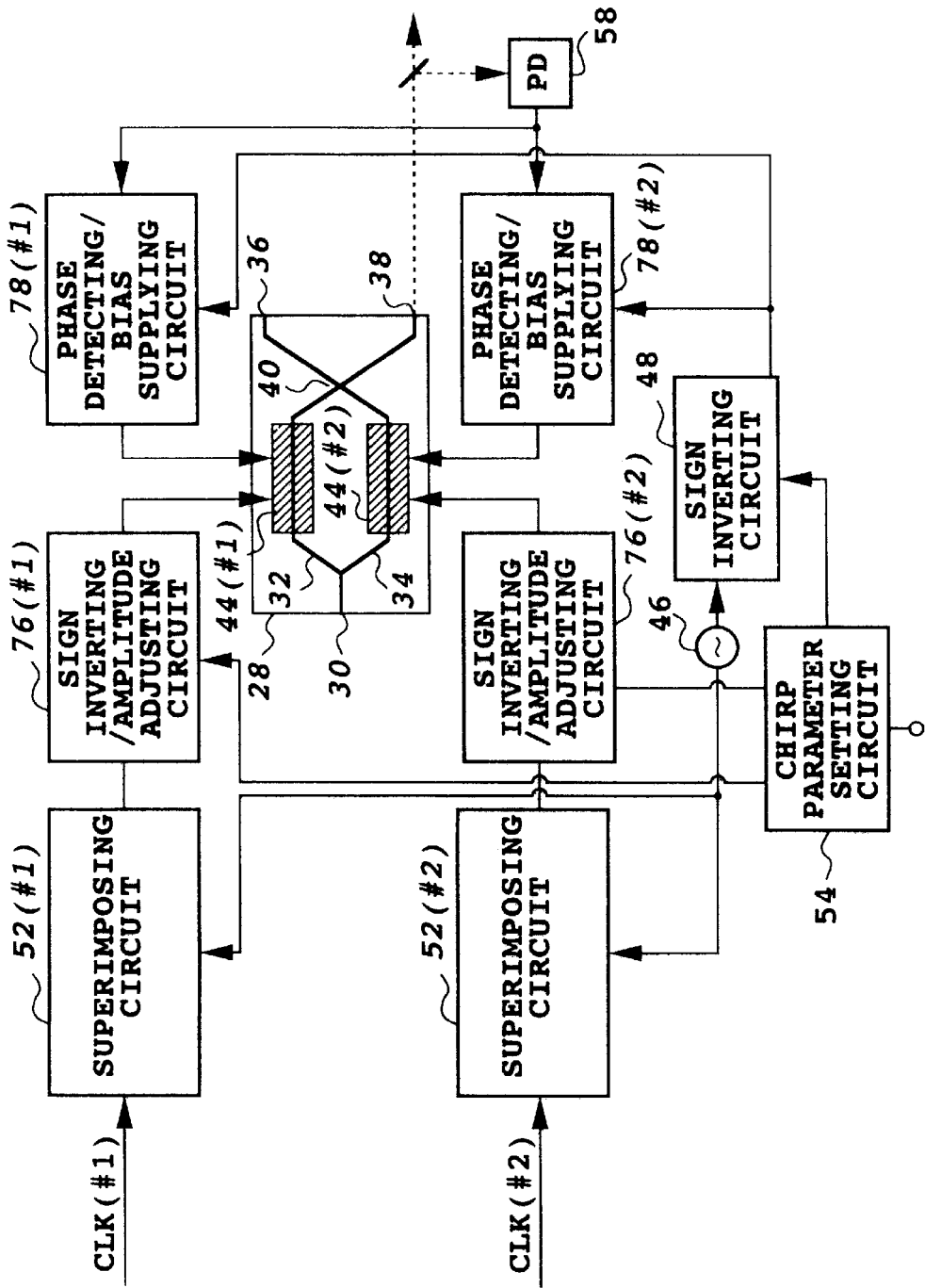
FIG. 8 is a block diagram showing another preferred embodiment of the drive circuit for the 1×2 optical switch shown in FIG. 2.

To apply an electric field to at least one of the optical paths 32 and 34 in the optical switch 28, there is provided at least one electrode (electrode 44 shown in FIG. 5 or electrodes 44 (#1 and #2) shown in FIG. 8). A bias voltage is supplied to the electrode. Further, there is employed for the optical switch 28 a drive circuit including a function of controlling the bias voltage so that an operating point of the optical switch 28 is stabilized. Similarly, drive circuits respective for the optical modulators 42 (#1 and #2) are also employed. In the first preferred embodiment shown in FIG. 2, the chirp parameter is set in the optical switch 28, so the drive circuit for the optical switch 28 will now be described in detail.

Referring to FIG. 5, there is shown a preferred embodiment of the drive circuit for the optical switch 28 shown in FIG. 2. In this preferred embodiment, an electrode 44 is provided on the optical path 34 to gener ate an optical clock and stabilize an operating point. An electric field generated between the electrode 44 and a grounded electrode not shown changes the refractive index of the optical path 34 to thereby generate a phase difference between the light beam propagating in the optical path 32 and the light beam propagating in the optical path 34. These propagating light beams interfere with each other in the intersecting type optical coupler 40, so that the first and second optical clocks are output from the output ports 36 and 38, respectively.

To stabilize the operating point, a low-frequency signal having a frequency $f_0$ output from an oscillator 46 is used. The low-frequency signal is supplied through a sign inverting circuit 48 to a superimposing circuit 52. A clock CLK from an external circuit is supplied through a sign inverting circuit 50 to the superimposing circuit 52. The low-frequency signal is superimposed on the clock in the superimposing circuit 52, and a resultant superimposed signal is supplied to the electrode 44. The superimposing circuit 52 is composed of a gain varying type amplifier and a capacitor for AC-connecting the amplifier to the electrode 44. The sign inverting circuits 48 and 50 are controlled by a chirp parameter setting circuit 54. The detail of this control will be hereinafter described. A bias voltage so controlled as to stabilize the operating point is supplied from a bias circuit 56 to the electrode 44. To effect this control, a part of the output optical signal from the optical switch 28 (specifically, the OTDM signal 20) is converted into an electrical signal by a photodetector 58. This v electrical signal includes a low-frequency component having a frequency $f_0$. A phase detector (synchronous detecting circuit) 60 performs phase comparison between the low-frequency signal from the oscillator 46 and the low-frequency component from the photodetector 58. The result of this phase comparison appears in a DC component of an output signal from the phase detector 60. Accordingly, the DC component is extracted by a low-pass filter 62 and fed back to the bias circuit 56. In this feedback loop, the bias circuit 56 controls the bias voltage so that the low-frequency component from the photodetector 58 is minimized.

Figure 6:
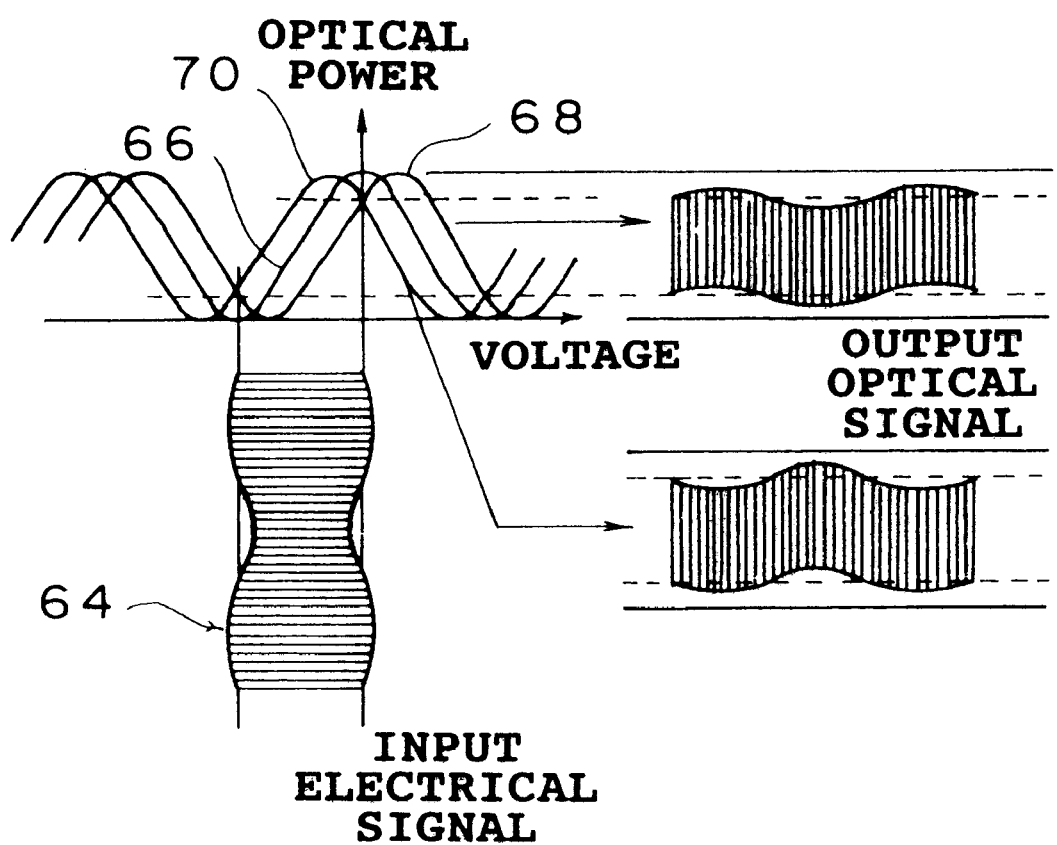
FIG. 6 is an illustration of the principle of stabilization of an operating point.

Referring to FIG. 6, there is shown a principle of stabilization of the operating point by the use of the drive circuit shown in FIG. 5. Reference numeral 64 denotes a waveform of the input electrical signal, that is, a waveform of the clock on which the low-frequency signal has been superimposed, output from the superimposing circuit 52. An optimum operating point of the optical switch 28 is determined by an operating characteristic curve such that both levels of the input electrical signal 64 provide maximum and minimum output powers as shown by reference numeral 66. The operating characteristic curve is a sine curve representing the relation between optical power and applied voltage, and shifting of the operating characteristic curve in a direction of voltage is called operating point drift. When the characteristic curve is shifted as shown by reference numeral 68 or 70 due to variations in temperature or the like, a low-frequency component is generated in the output optical signal, and the direction of shifting is reflected on the phase of the low-frequency component. That is, the phases of envelopes of the output optical signals provided by the characteristic curves 68 and 70 are different 180° from each other. Accordingly, the operating point of the optical switch 28 is stabilized by performing synchronous detection with the phase detector 60 as shown in FIG. 5.

There will now be described switching of a chirp parameter by the use of the sign inverting circuits 48 and 50 with reference to FIGS. 7A to 7D. In an optical switching device utilizing interference such as a balanced bridge type 1×2 optical switch or a Mach-Zehnder type optical modulator, prechirping can be performed by utilizing a wavelength change (chirping) substantially generated by interference. The prechirping is a method for suppressing degradation of a transmission waveform due to chromatic dispersion and nonlinear effects, by preliminarily providing a wavelength (frequency) change in one pulse of an optical signal to be transmitted.

Figure 7A:
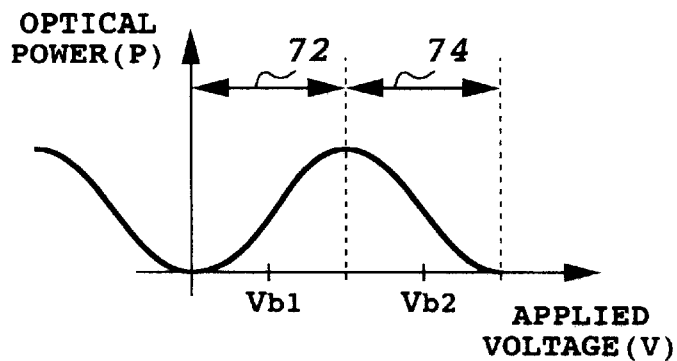
FIGS. 7A to 7D are graphs for illustrating switching of a chirp parameter.

In the optical switch 28 shown in FIG. 5, for example, the operating characteristic curve is given as a sine curve, so that there are a plurality of operating points that can become stable points. Referring to FIG. 7A, there is shown an operating characteristic curve of the optical switch 28. When a region 72 in the vicinity of one stable point Vb1 is used as an applied voltage to apply a positive voltage pulse as shown by a left-hand graph in FIG. 7B, a positive optical pulse having the same polarity as that of the voltage pulse is output as shown by a left-hand graph in FIG. 7C, because optical power (P) increases with an increase in applied voltage (V) in the region 72. At this time, the wavelength becomes shorter than an average value at a rising part of the optical pulse, and becomes longer than the average value at a falling part of the optical pulse as shown by a left-hand graph in FIG. 7D. That is, in one optical pulse the wavelength is shifted from a shorter-wavelength side (blue side) to a longer-wavelength side (red side) as time (t) proceeds. This phenomenon is called red shift.

Figure 7B:
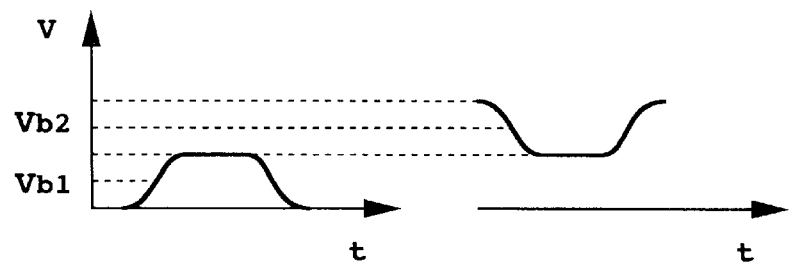
Figure 7C:
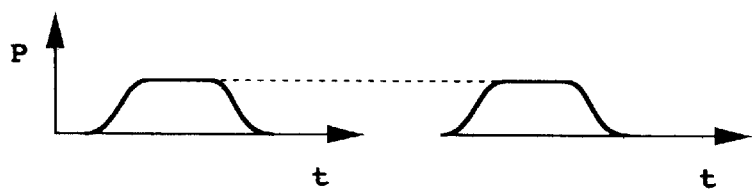
Figure 7D:
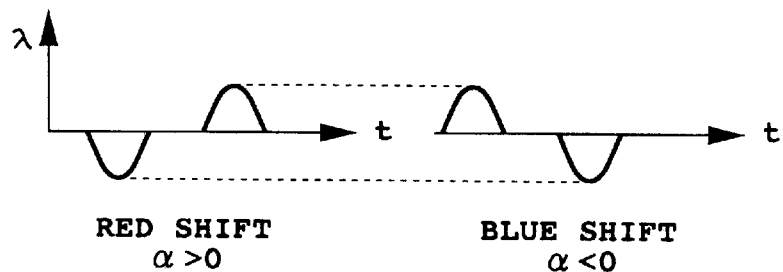

In contrast, when a region 74 in the vicinity of another stable point Vb2 is used to apply a negative voltage pulse as shown by a right-hand graph in FIG. 7B, a positive optical pulse having a polarity opposite to that of the voltage pulse is output as shown in a right-hand graph in FIG. 7C, because optical power (P) decreases with an increase in applied voltage (V) in the region 74. At this time, the wavelength is shifted to a longer-wavelength side at a rising part of the optical pulse, and is shifted to a shorter-wavelength side at a falling part of the optical pulse as shown by a right-hand graph in FIG. 7D. That is, in one optical pulse, the wavelength is shifted from a longer-wavelength side (red side) to a shorter-wavelength side (blue side) as time (t) proceeds. This phenomenon is called blue shift.

A chirp parameter α of an optical pulse is defined as $$\alpha = 2(d\phi/dt)/(dS/dt)/S \quad (2)$$

where φ is the optical phase, and S is the optical intensity. In the case of red shift, the chirp parameter a takes a positive value, whereas in the case of blue shift, the chirp parameter α takes a negative value. When the wavelength of an optical signal is shorter than the zero-dispersion wavelength of an optical fiber used as a transmission line, and falls in a region of normal dispersion (D<0), light of a longer wavelength travels faster than light of a shorter wavelength in the optical fiber. Accordingly, by preliminarily providing prechirping of α>0 (red shift), pulse compression occurs to increase an eye opening. Conversely, when the wavelength falls in a region of anomalous dispersion (D>0), light of a shorter wavelength travels faster than light of a longer wavelength in the optical fiber. Accordingly, by preliminarily providing prechirping of α<0 (blue shift), the eye opening can be increased. Further, by adjusting the value of the chirp parameter α in response to the conditions of the transmission line, the transmission conditions of the whole system can be optimized.

In the drive circuit shown in FIG. 5, the chirp parameter setting circuit 54 switches the stable points Vb1 and Vb2 to thereby allow switching of the positive and negative values of the chirp parameter α. More specifically, in the drive circuit shown in FIG. 5, the sign inverting circuit 48 is provided to invert the polarity of the low-frequency signal to be supplied from the oscillator 46 to the superimposing circuit 52. When the polarity of the low-frequency signal is inverted by the sign inverting circuit 48, the phase of the low-frequency signal superimposed on the clock is inverted. As a result, the direction of control in the feedback loop including the photodetector 58 is inverted. Accordingly, assuming that the stable point before switching is Vb1 as shown in FIG. 7A, the stable point after switching becomes Vb2. As a result, the sign of the chirp parameter α is inverted from a positive value to a negative value. In this case, optical power increases with an increase in applied voltage at the stable point Vb1 before switching, but decreases with an increase in applied voltage at the stable point Vb2 after switching. Accordingly, the sign inverting circuit 50 for an external clock is adopted to maintain identical with each other the relation between high level and low level in an electrical signal clock and the relation between high level and low level in an optical clock.

While the sign inverting circuit 48 is provided between the oscillator 46 and the superimposing circuit 52 in the drive circuit shown in FIG. 5, the sign inverting circuit 48 may be provided between the oscillator 46 and the phase detector 60 or between the photodetector 58 and the phase detector 60.

In the drive circuit shown in FIG. 5, the chirp parameter α is switched in sign to thereby allow adaptation of the chirp parameter of the OTDM signal 20 (see FIG. 1, for example) to the conditions of the optical transmission line 18, so the drive circuit shown in FIG. 5 is sufficiently practical. However, not only the desire for switching of the sign of the chirp parameter α, but also a desire for setting of the chirp parameter α to an arbitrary value is present.

To allow setting of the chirp parameter α to an arbitrary value, electrodes 44 (#1 and #2) independent of each other are provided respectively on the optical paths 32 and 34 in the optical switch 28 as shown in FIG. 8. In the drive circuit shown in FIG. 8, first and second bias voltages are independently applied to the electrodes 44 (#1 and #2), respectively, and the prechirp means 22 (see FIG. 1) includes means for changing a ratio between the first and second bias voltages (modulation ratio). In the case of performing asymmetrical modulation by using the electrodes 44 (#1 and #2), an arbitrary chirp parameter α can be obtained according to the modulation ratio. In this case, the chirp parameter α is given by the following equation.

$$\alpha = \frac{(\eta_1 - \eta_2)}{(\eta_1 + \eta_2)} \cdot \frac{1 + \cos(\pi \cdot V(t)/V\pi)}{\sin(\pi \cdot V(t)/V\pi)} \quad (3)$$

where $\eta_1$ and $\eta_2$ are the phase modulation factors in the optical paths 32 and 34, respectively, $V\pi$ is the operating voltage, and V(t) is the driving voltage. From Eq. (3), the chirp parameter α takes different values at different parts of a waveform, wherein a minimum value $\alpha_0 = (\eta_1-\eta_2)/(\eta_1+\eta_2)$ is obtained at $V(t)=V\pi/2$ (center of bit), and α becomes infinity at $V(t)=0$ or $V\pi$.

Figure 9:
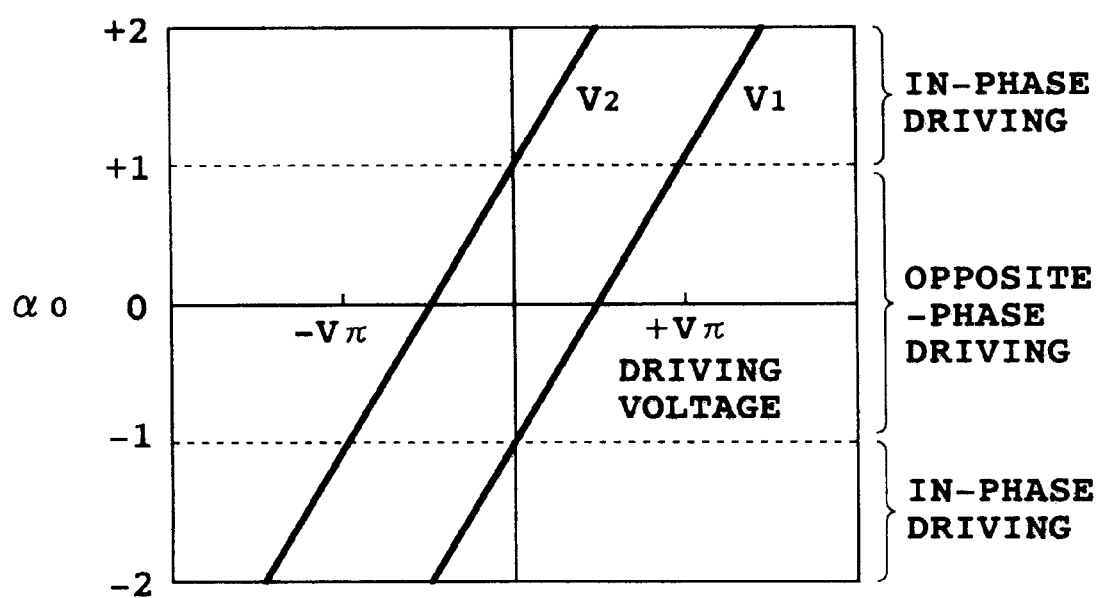
FIG. 9 is a graph showing the relation between $\alpha_0$ and driving voltages $V_1$ and $V_2$.

Referring to FIG. 9, there is shown the relation between $\alpha_0$ and driving voltages $V_1$ and $V_2$. The driving voltages $V_1$ and $V_2$ are the applied voltages to the electrodes 44 (#1 and #2), respectively. By setting the ratio in absolute value between the driving voltages $V_1$ and $V_2$ to 1:1, $\alpha_0=0$ can be obtained. In this case, $V_1=+V\pi/2$ and $V_2=-V\pi/2$, so that the absolute values of the driving voltages can be minimized. By reversing the signs of the driving voltages $V_1$ and $V_2$ to each other to perform opposite-phase driving, $0<|\alpha_0|<1$ can be obtained. By setting any one of the driving voltages $V_1$ and $V_2$ to zero, and setting the other to $+V\pi$ or $-V\pi$, $|\alpha_0|=1$ can be obtained. By making the signs of the driving voltages $V_1$ and $V_2$ identical with each other to perform in-phase driving, $1<|\alpha_0|$ can be obtained. In this case, the absolute value of at least one of the driving voltages $V_1$ and $V_2$ becomes greater than $V\pi$.

In the drive circuit shown in FIG. 8, the voltages to be applied to the electrodes 44 (#1 and #2) are independently changed in such a manner that the difference between the driving voltages $V_1$ and $V_2$ is maintained so that the difference in phase modulation amount between the optical paths 32 and 34 becomes π, thereby continuously setting the chirp parameter. Sign inverting/amplitude adjusting circuits 76 (#1 and #2) are provided on the input sides of the electrodes 44 (#1 and #2), respectively. Phase detecting/bias supplying circuits 78 (#1 and #2) each having the functions of the phase detector 60, the low-pass filter 62, and the bias circuit 56 shown in FIG. 5 are connected to the output sides of the electrodes 44 (#1 and #2), respectively. The polarities of low-frequency signals to be supplied from an oscillator 46 to the circuits 78 (#1 and #2) are inverted by a sign inverting circuit 48. Accordingly, switching of an operating point is allowed. Further, by operating the sign inverting/amplitude adjusting circuits 76 (#1 and #2) in concert with the switching of the operating point to select a given set of amplitudes and polarities of driving voltages, thereby allowing setting of an arbitrary chirp parameter. In the drive circuit shown in FIG. 8, two clocks CLK (#1 and #2) of the same phase may be corresponding to the electrodes 44 (#1 and #2).

Figure 10:
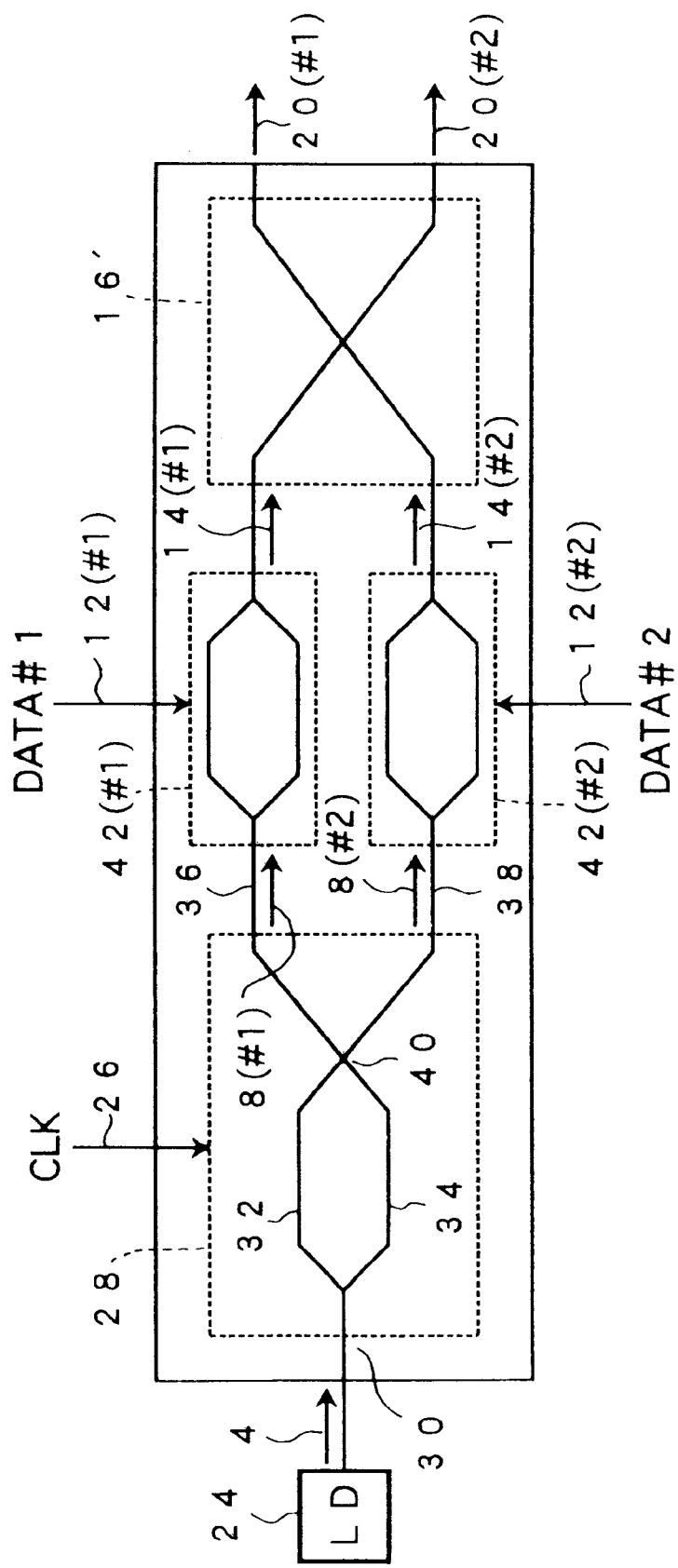
FIG. 10 is a block diagram showing a second preferred embodiment of the first basic configuration.

Referring to FIG. 10, there is shown a second preferred embodiment of the first basic configuration. In this preferred embodiment, an optical multiplexer 16' configured by an intersecting type optical coupler is used in place of the optical multiplexer 16 configured by the Y-branch (see FIG. 2). With this configuration, two OTDM signals 20 (#1 and #2) complementary to each other may be obtained. The advantages by the use of the optical multiplexer 16' configured by the intersecting type optical coupler are that wavelength dependence can be reduced and a device length can be reduced. In the case of using the Y-branch, no wavelength dependence occurs, but a device length must be increased in order to leak a high-order mode. In the case that there are no limitations on the wavelength dependence and the device length, an optical multiplexer configured by a directional optical coupler may also be used.

Figure 11:
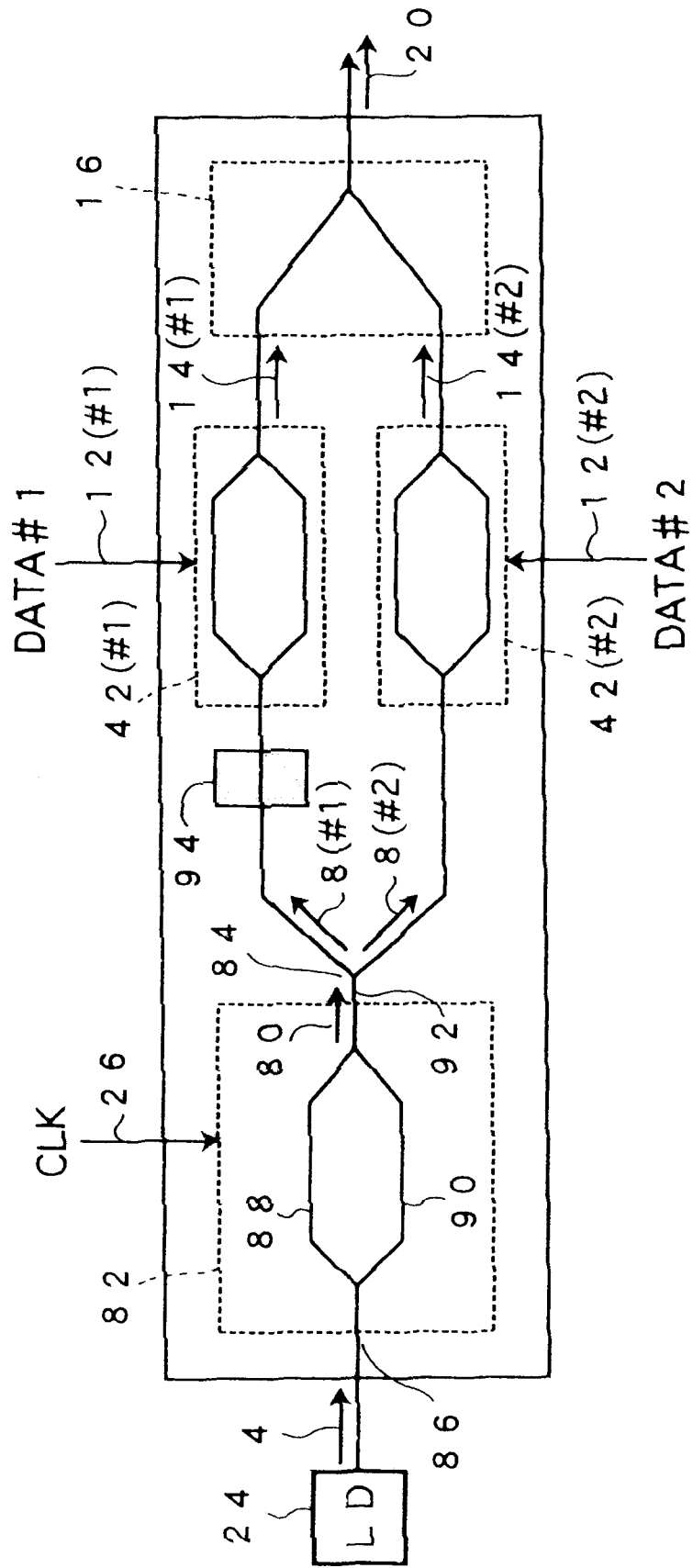
FIG. 11 is a block diagram showing a third preferred embodiment of the first basic configuration.

Referring to FIG. 11, there is shown a third preferred embodiment of the first basic configuration. In this preferred embodiment, the clock generating means 6 (see FIG. 1) includes an optical modulator 82 for intensity-modulating a carrier beam 4 by a clock 26 to output a clock modulated beam 80, and a Y-branch 84 for branching the clock modulated beam 80 into a first optical clock 8 (#1) and a second optical clock 8 (#2). Particularly in this preferred embodiment, the optical modulator 82 is a Mach-Zehnder type modulator. The optical modulator 82 has an input port 86 operatively connected to a laser diode 24 as a light source, a first optical path 88 and a second optical path 90 branched from the input port 86, and an output port 92 at which the optical paths 88 and 90 are joined together. In this preferred embodiment, the optical clocks 8 (#1 and #2) have the same phase. To make the optical clocks 8 (#1 and #2) have opposite phases, there is provided means for delaying any one of the optical clocks 8 (#1 and #2). More specifically, an optical delay circuit 94 having a delay corresponding to a half bit of the optical clock 8 (#1) is provided between the Y-branch 84 and the optical modulator 42 (#1).

Figure 12:
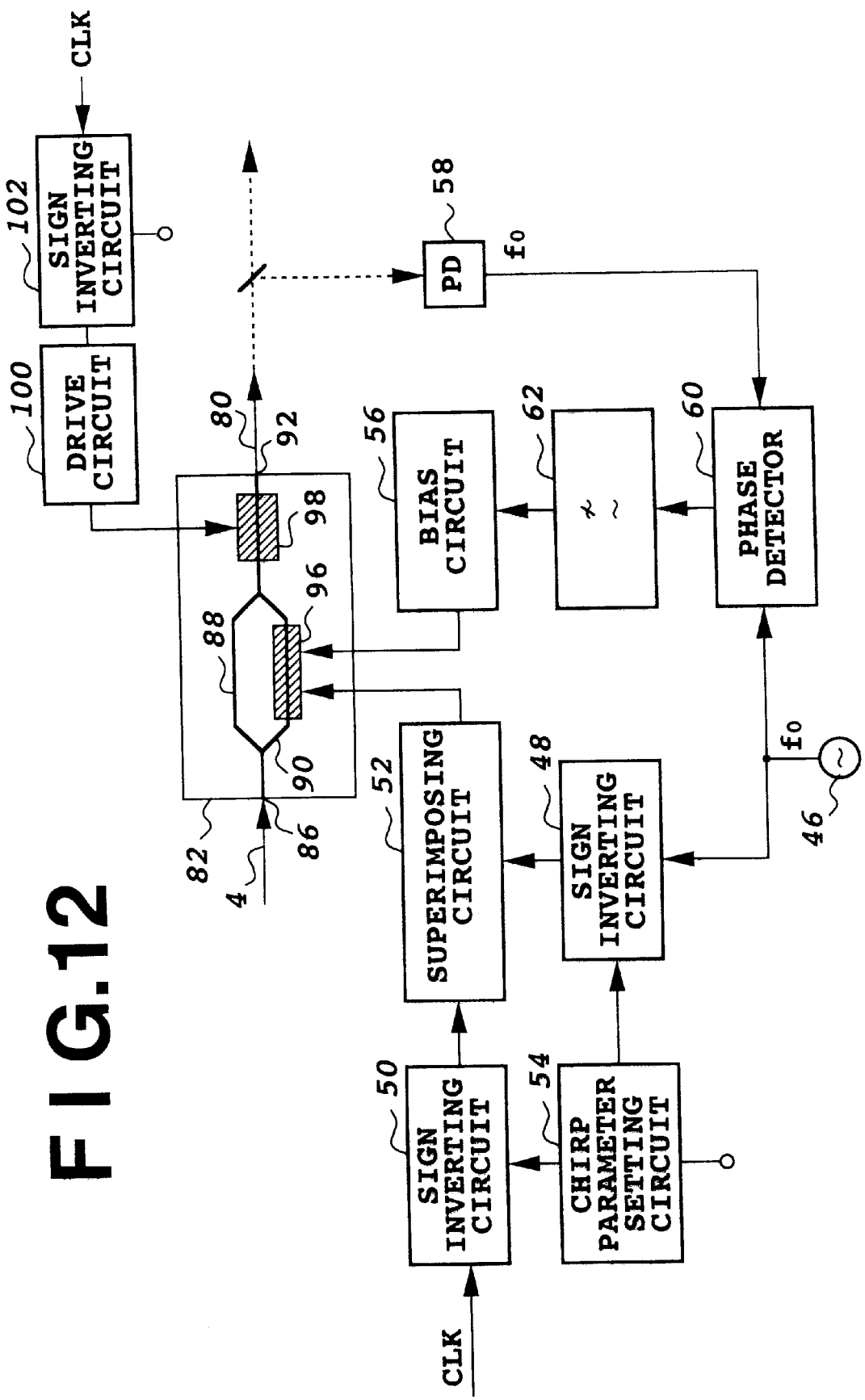
FIG. 12 is a block diagram showing a preferred embodiment of a drive circuit for an optical modulator shown in FIG. 11.

Referring to FIG. 12, there is shown a preferred embodiment of a drive circuit for the optical modulator 82 shown in FIG. 11. To intensity-modulate the carrier beam 4 by the clock, an electrode 96 corresponding to the electrode 44 shown in FIG. 5 is provided on the optical path 90. Further, to obtain an arbitrary chirp parameter by addition of chirping, an electrode 98 for phase modulation is provided near the output port 92. Circuits for stabilization of an operating point and switching of a chirp parameter in the optical modulator 82 is similar to that mentioned above with reference to FIG. 5, so the description of its configuration and principle will be omitted herein.

In a waveguide type phase modulator, a phase modulation amount can be adjusted in general according to the voltage and polarity of an electrical signal to be applied to the phase modulator. In the case of using such a phase modulator with an intensity modulator, an arbitrary chirp parameter can be set by adjusting the amplitude and polarity of a driving signal for the phase modulator in concert with switching of chirping in the intensity modulator.

A signal synchronous with a clock is supplied from a drive circuit 100 to the electrode 98 for phase modulator, and a direction of phase modulation is changed between a front half and a rear half of one optical pulse to thereby add chirping. For example, in a dielectric waveguide, a chirping amount depends on the amplitude of an input signal, and a direction of change in chirping is inverted in accordance with inversion of the polarity of the signal. Accordingly, in the drive circuit shown in FIG. 12, a sign inverting circuit 102 is provided in the path of the clock to the drive circuit 100 to invert the polarity of the clock in concert with the operating point shift, thereby effecting addition of arbitrary chirping by the electrode 98 in the same direction as that of a chirping amount (fixed amount) given by the electrode 96 without any influence of a change in chirping direction by the operating point shift. Accordingly, although intensity modulation is performed by the electrode 96 provided on only one of the optical paths 88 and 90, the chirp parameter can be continuously set to an arbitrary value.

Figure 13B:
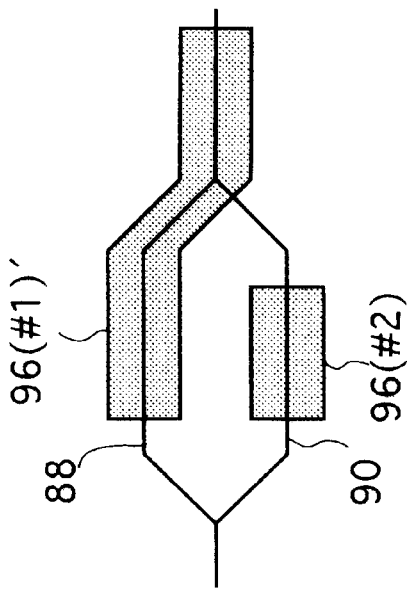
FIGS. 13A to 13D are diagrams showing various arrangements of electrodes in the optical modulator 82 shown in FIG. 11.
Figure 13D:
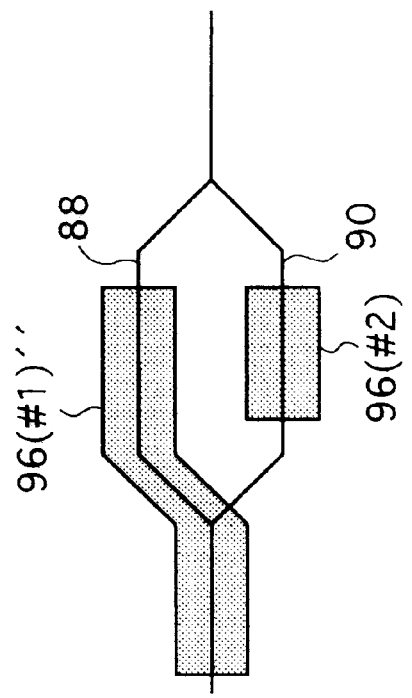
Figure 13A:
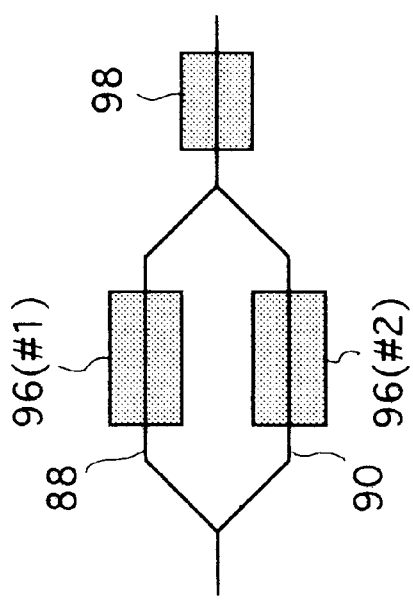
Figure 13C:
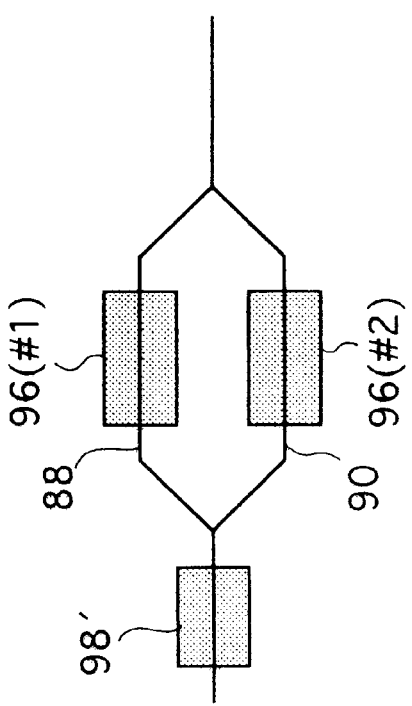

Referring to FIGS. 13A to 13D, there are shown various arrangements of electrodes in the optical modulator 82 shown in FIG. 11. In contrast with the arrangement shown in FIG. 12, the arrangement shown in FIG. 13A is characterized in that independent electrodes 96 (#1 and #2) for intensity modulation are provided on the optical paths 88 and 90, respectively. As similar to FIG. 12, an electrode 98 for phase modulation is provided on the output side. In the arrangement shown in FIG. 13B, an electrode 96 (#1)' for intensity modulation which is integrated with an electrode (98) for phase modulation is used. The integral electrode 96 (#1)' is configured as a traveling wave type, so that a driving voltage for setting an arbitrary chirp parameter can be reduced. In the arrangement shown in FIG. 13C, an electrode 98' for phase modulation is provided on the input side. In the arrangement shown in FIG. 13D, an electrode 96 (#1)" for intensity modulation which is inLegrated with an electrode (98') for phase modulation is used.

Figure 14:
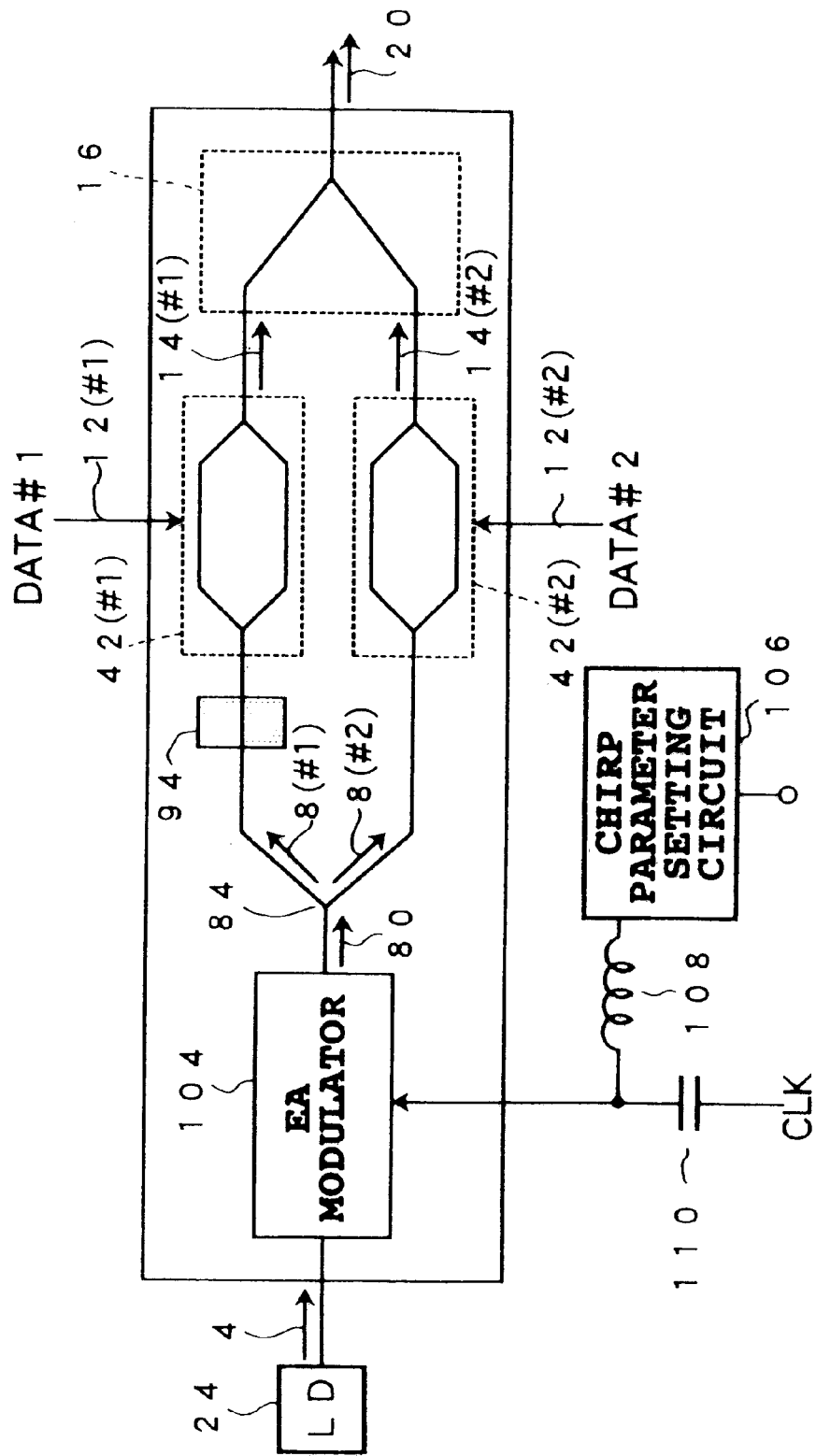
FIG. 14 is a block diagram showing a fourth preferred embodiment of the first basic configuration.

Referring to FIG. 14, there is shown a fourth preferred embodiment of the first basic configuration. In this preferred embodiment, an electro-absorbing type modulator (EA modulator) 104 is used in place of the Mach-Zehnder type modulator 82 used in the third preferred embodiment shown in FIG. 11, and a specific drive circuit therefor is adopted. The EA modulator 104 is supplied with a bias voltage controlled through an inductor 108 from a chirp parameter setting circuit 106. A clock is superimposed on the bias voltage through a capacitor 110. Accordingly, the EA modulator 104 intensity-modulates a carrier beam 4 to output a clock modulated beam 80. The clock modulated beam 80 is branched into optical clocks 8 (#1 and #2) of the same phase in a Y-branch 84. The principle of generation of an OTDM signal 20 based on the optical clocks 8 (#1 and #2) is similar to that mentioned in the previous preferred embodiments, so the description thereof will be omitted herein.

Figure 15:
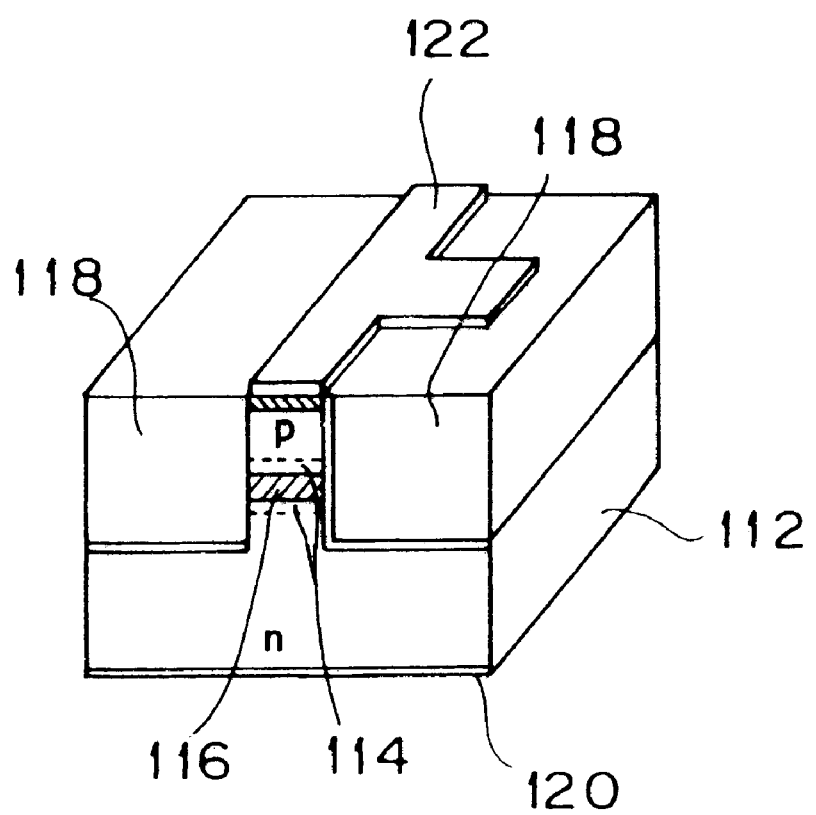
FIG. 15 is a perspective view showing a preferred embodiment of an electro-absorbing type modulator (EA modulator)

Referring to FIG. 15, there is shown a preferred embodiment of the EA modulator. The EA modulator shown in FIG. 15 has an absorbing layer 116 formed from an InGaAsP (undoped) bulk layer sandwiched by InGaAsP buffer layers 114. The thickness of the absorbing layer 116 is adjusted in a fabrication process, and the width of the absorbing layer 116 is defined by a pair of polyimide layers 118 provided on the opposite sides thereof. A grounded electrode 120 and a signal electrode 122 are provided to apply an electric field to the absorbing layer 116. By changing a voltage to be applied between the electrodes 120 and 122, an absorptivity of light in the absorbing layer 116 is changed to allow intensity modulation. For the detail of the EA modulator shown in FIG. 15, see Yamada et al., IEICE, Technical Report LQE95-17.

Figure 16:
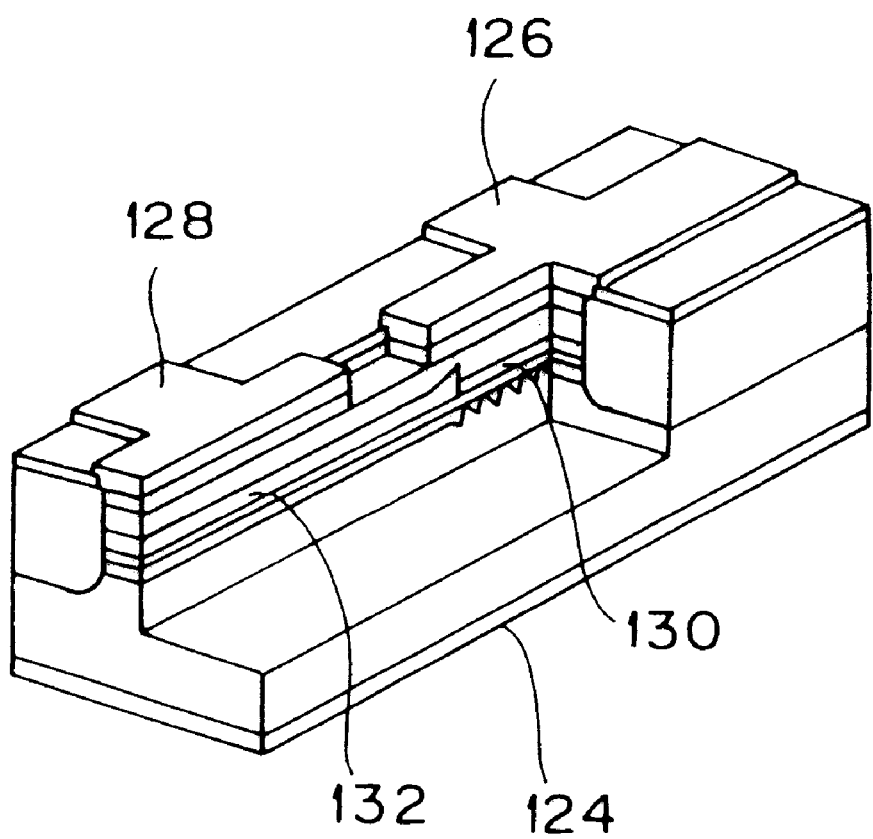
FIG. 16 is a partially broken away, perspective view showing another preferred embodiment of the EA modulator (modulator integrated DFB-LD)

Referring to FIG. 16, there is shown another preferred embodiment of the EA modulator. The EA modulator shown in FIG. 16 is integrated with a laser diode (DFB-LD) as a light source. Therefore, this structure may be called as a modulator integrated DFB-LD. Reference numeral 124 denotes a grounded electrode, 126 denotes an electrode for the laser diode, and 128 denotes an electrode for the EA modulator. An active layer 130 for outputting a carrier beam is provided between the grounded electrode 124 and the electrode 126, and an absorbing layer 132 is provided between the grounded electrode 124 and the electrode 128. The carrier beam generated from the active layer 130 is absorbed directly by the absorbing layer 132, and an amount of absorption is changed to thereby effect intensity modulation. Such an EA modulator integrated with a laser diode is useful from the viewpoints of reduction in size and loss. For the detail of the EA modulator shown in FIG. 16, see Morito et al., IEICE, Technical Report LQE95-17, pp.1–6.

Figure 17:
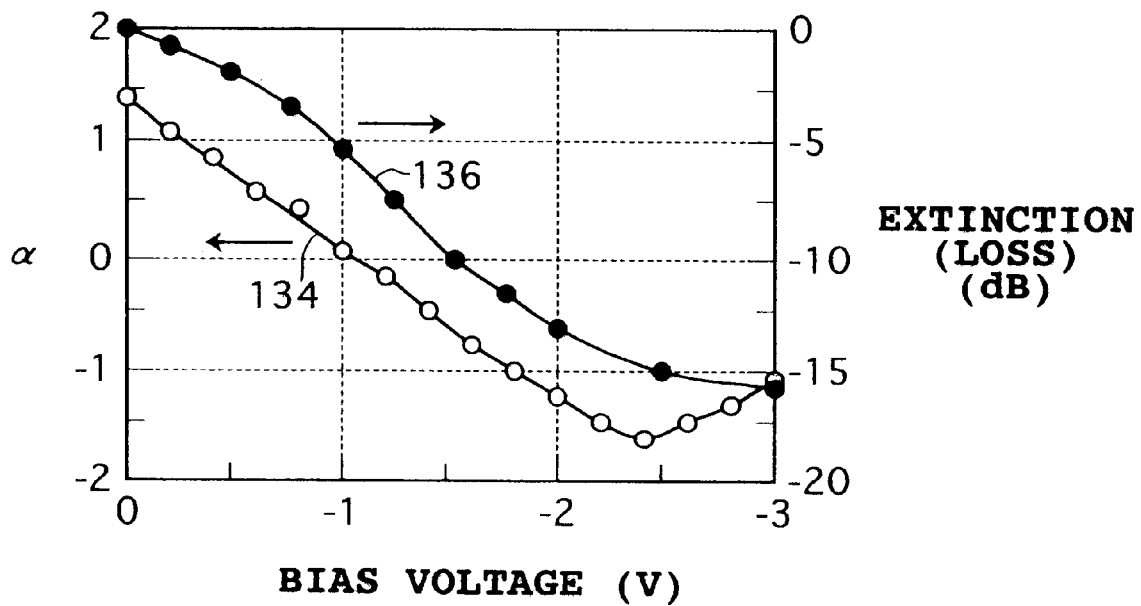
FIG. 17 is a graph showing the relation between chirp parameter $\alpha$ and extinction, and bias voltage.

Referring to FIG. 17, there is shown the relation between chirp parameter α and extinction (loss), and bias voltage in a general EA modulator. Reference numerals 134 and 136 denote changes in chirp parameter α and extinction (loss), respectively, when the bias voltage applied to the EA modulator is changed. With an increase in the bias voltage, the chirp parameter a decreases from positive values to negative values, and the degree of extinction becomes larger. Accordingly, a desired chirp parameter α can be obtained by changing the bias voltage to be applied from the chirp parameter setting circuit 106 to the EA modulator 104 shown in FIG. 14.

While the clock generating means 6 (see FIG. 1) includes one optical switch or one optical modulator to obtain the optical clocks 8 (#1 and #2) in the previous preferred embodiments, the clock generating means 6 may include two optical modulators. This will be described with reference to FIGS. 18 and 19.

Figure 18:
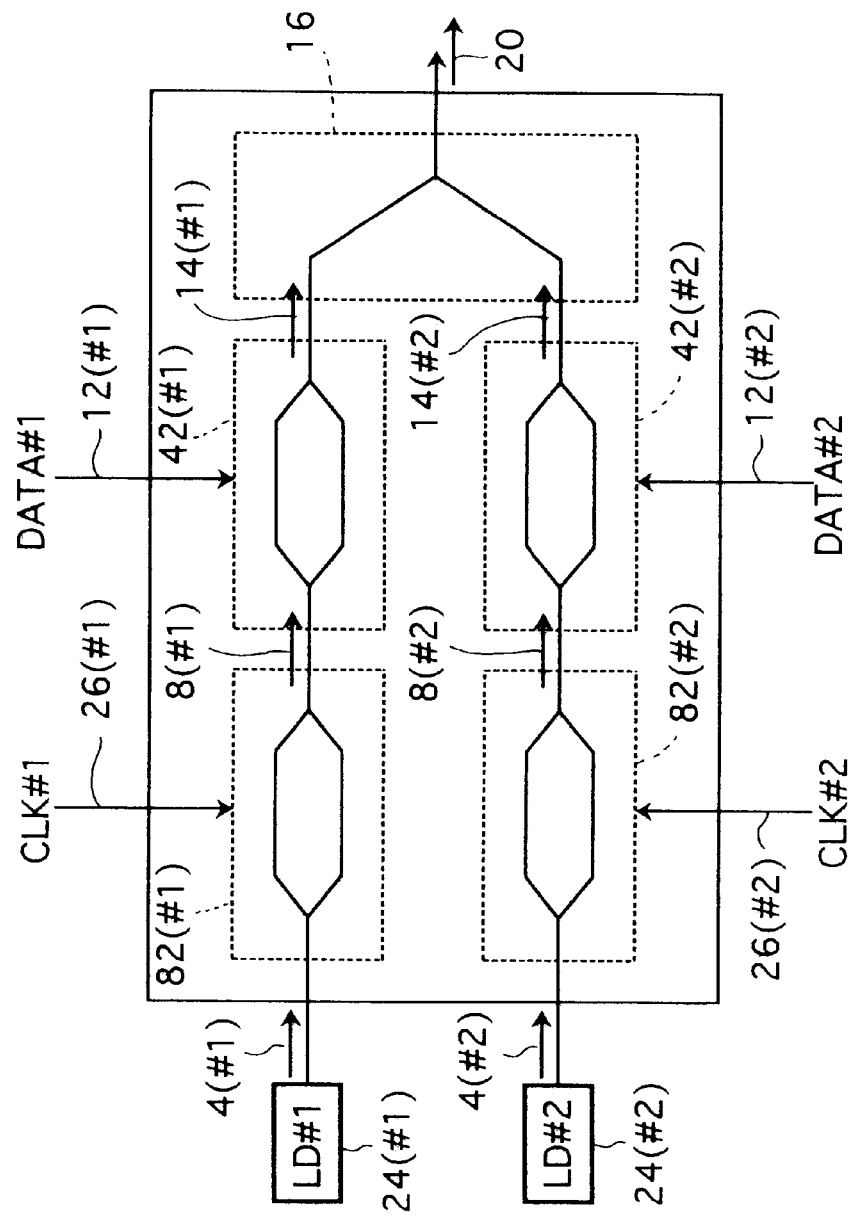
FIG. 18 is a block diagram showing a fifth preferred embodiment of the first basic configuration.

Referring to FIG. 18, there is shown a fifth preferred embodiment of the first basic configuration. Two laser diodes 24 (#1 and #2) for respectively outputting two carrier beams 4 (#1 and #2) are used as the light source 2 (see FIG. 1). The carrier beams 4 (#1 and #2) are supplied to optical modulators 82 (#1 and #2), respectively. The optical modulator 82 (#1) intensity-modulates the carrier beam 4 (#1) according to a clock 26 (#1) to generate a first optical clock 8 (#1). The optical modulator 82 (#2) intensity-modulates the carrier beam 4 (#2) according to a clock 26 (#2) to generate a second optical clock 8 (#2). The principle of generation of an OTDM signal 20 based on the optical clocks 8 (#1 and #2) is similar to that mentioned in the previous preferred embodiments, so the description thereof will be omitted herein.

A Mach-Zehnder type modulator (MZ modulator) or an electro-absorbing type modulator (EA modulator) may be used as each of the optical modulators 82 (#1 and #2). By applying a drive circuit as shown in FIG. 5 to the MZ modulator, the sign of a chirp parameter can be switched. Further, by applying a drive circuit as shown in FIG. 8 or FIG. 12 to the MZ modulator, an arbitrary chirp parameter can be set. Further, also in the case of using the EA modulator, an arbitrary chirp parameter can be set as mentioned above. In accordance with the EA modulator shown in FIG. 16, the LDs 24 (#1 and #2) may be integrated with the optical modulators 82 (#1 and #2), respectively.

In the fifth preferred embodiment shown in FIG. 18, the optical delay circuit 94 as shown in FIG. 11 may be used to reverse the phases of the optical clocks 8 (#1 and #2) to each other. Alternatively, an electronic circuit for reversing the phases of the clocks 26 (#1 and #2) to each other may be used in place of the optical delay circuit.

Figure 19:
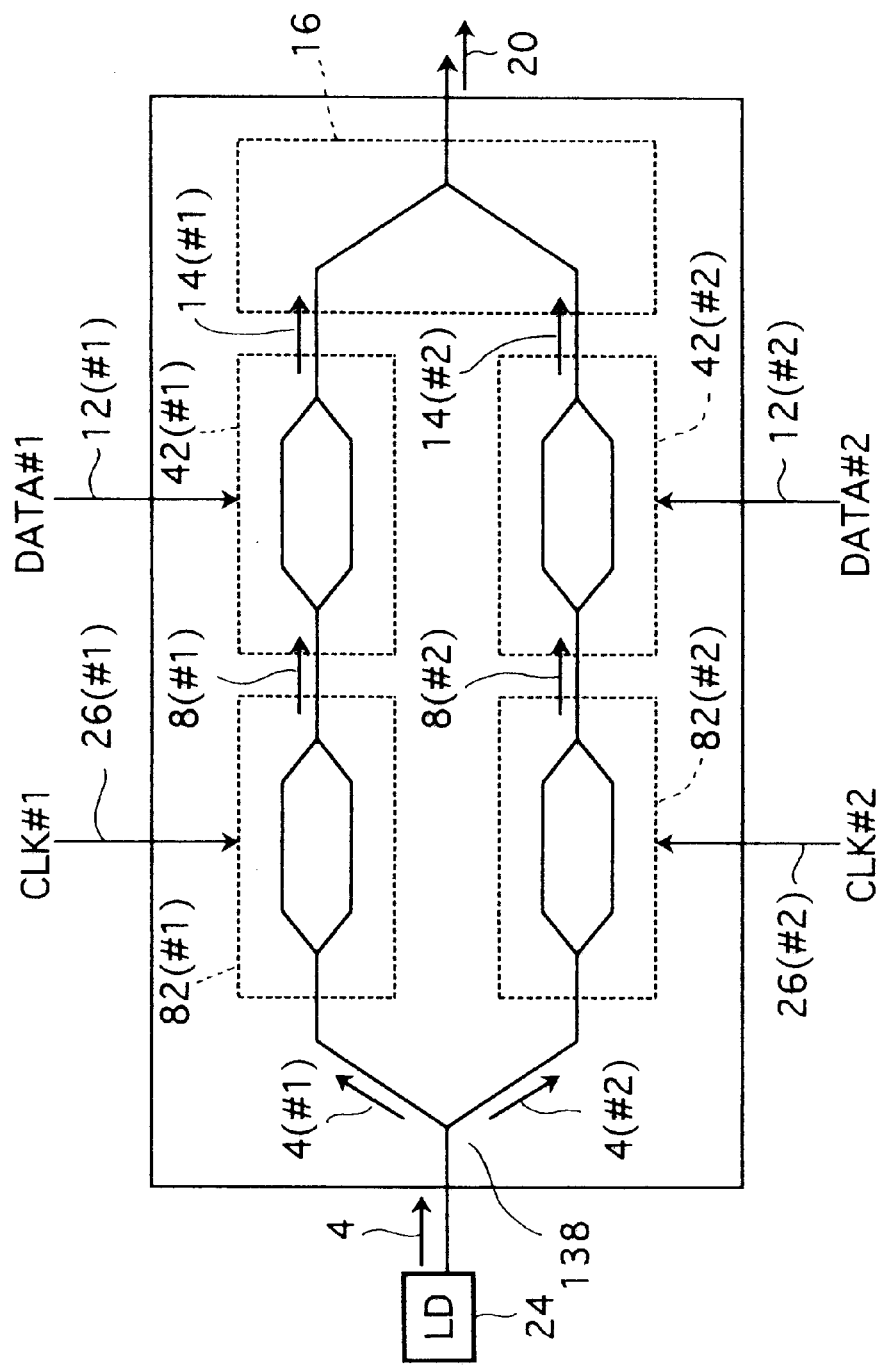
FIG. 19 is a block diagram showing a sixth preferred embodiment of the first basic configuration.

Referring to FIG. 19, there is shown a sixth preferred embodiment of the first basic configuration. Like the fifth preferred embodiment shown in FIG. 18, two optical modulators 82 (#1 and #2) are included in the clock generating means 6 (see FIG. 1). Unlike the fifth preferred embodiment shown in FIG. 18, one laser diode 24 is used as the light source 2. The laser diode 24 outputs a carrier beam 4. A Y-branch 138 is provided to branch the carrier beam 4 into two carrier beams 4 (#1 and #2). The optical modulator 82 (#1) intensity-modulates the carrier beam 4 (#1) according to a clock 26 (#1) to generate a first optical clock 8 (#1). The optical modulator 82 (#2) intensity-modulates the carrier beam 4 (#2) according to a clock 26 (#2) to generate a second optical clock 8 (#2). Like the previous preferred embodiments, an OTDM signal 20 is generated according to the optical clocks 8 (#1 and #2). The Y-branch 138 may be configured on one substrate monolithically with the optical modulators 82 (#1 and #2) and 42 (#1 and #2) and the optical multiplexer 16.

In the case of stabilizing or switching operating points of the optical modulators 82 (#1 and #2) in the preferred embodiments shown in FIGS. 18 and 19, the frequencies of low-frequency signals (reference signals) to be used for synchronous detection are preferably individually set.

While all of the clock generating means 6, the data modulating means 10 (#1 and #2), and the optical multiplexer 16 are monolithically integrated in the previous preferred embodiments of the first basic configuration, at least two of these components may be monolithically integrated.

Figure 20:
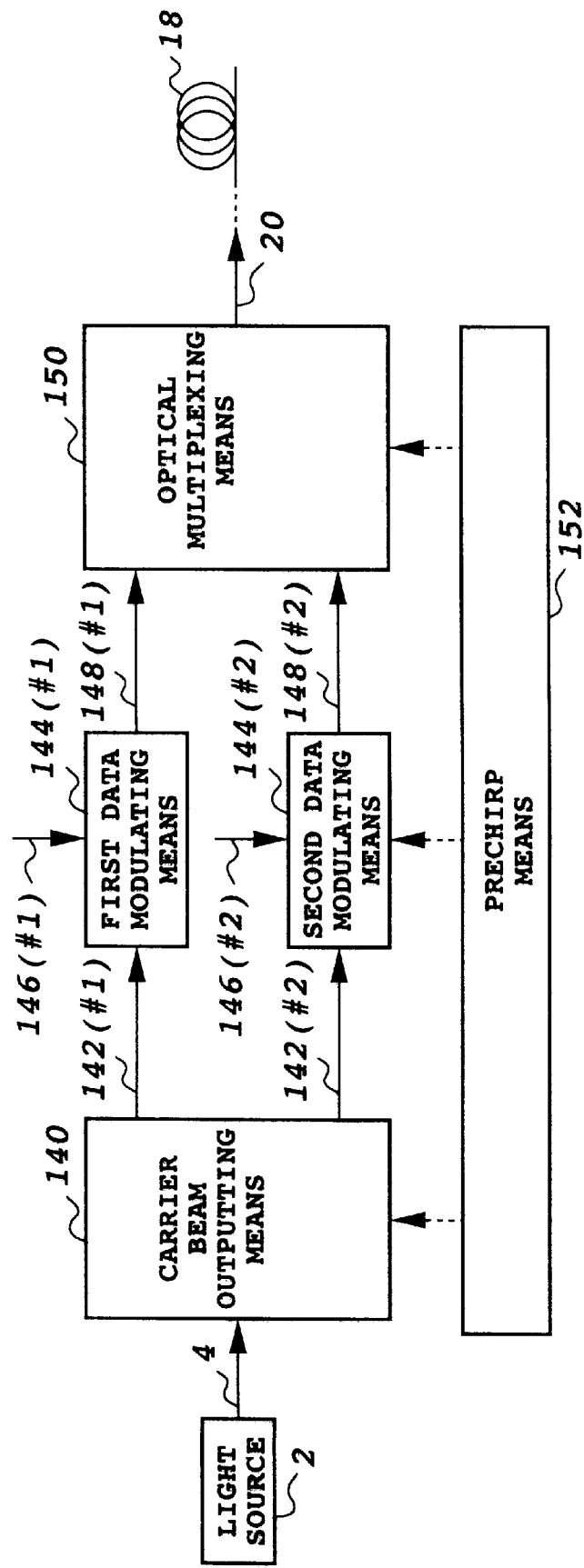
FIG. 20 is a block diagram showing a second basic configuration of the optical modulating device according to the present invention.

Referring to FIG. 20, there is shown a second basic configuration of the optical modulating device according to the present invention. Carrier beam outputting means 140 outputs a first carrier beam 142 (#1) and a second carrier beam 142 (#2) according to a carrier beam 4 output from a light source 2. First data modulating means 144 (#1) switches on/off the first carrier beam 142 (#2) by receiving a first data signal 146 (#1) to thereby generate a first data modulated beam 148 (#1). Second data modulating means 144 (#2) switches on/off the second carrier beam 142 (#2) by receiving a second data signal 146 (#2) to thereby generate a second data modulated beam 148 (#2). Optical multiplexing means 150 applies first and second optical clocks to the data modulated beams 148 (#1and #2), respectively, to thereby generate a first and second signal beams and then combines the first and second signal beams to thereby generate an OTDM signal 20. Prechirp means 152 controls at least one of the carrier beam 4, the carrier beams 142 (#1 and #2), the data modulated beams 148 (#1 and #2), and the OTDM signal 20 so that the OTDM signal 20 has a predetermined chirp parameter. The OTDM signal 20 is transmitted through an optical transmission line 18 to an optical repeater or an optical receiver (both not shown). The chirp parameter of the OTDM signal 20 is set so as to be adapted to the optical transmission line 18, for example.

In this manner, the second basic configuration is different from the first basic configuration shown in FIG. 1 in the point that the modulation by the clocks and the modulation by the data signals are reversed in order. That is, after the two data modulated beams 148 (#1 and #2) are generated by the data modulating means 144 (#1 and #2), these modulated beams are modulated by the clocks. Thereafter, the resultant signal beams are multiplexed on a time axis. Also in the second basic configuration, the modulation by the clocks is predominant for the chirp parameter. Accordingly, the prechirp means 152 sets the chirp parameter preferably in the optical multiplexing means 150.

Figure 21:
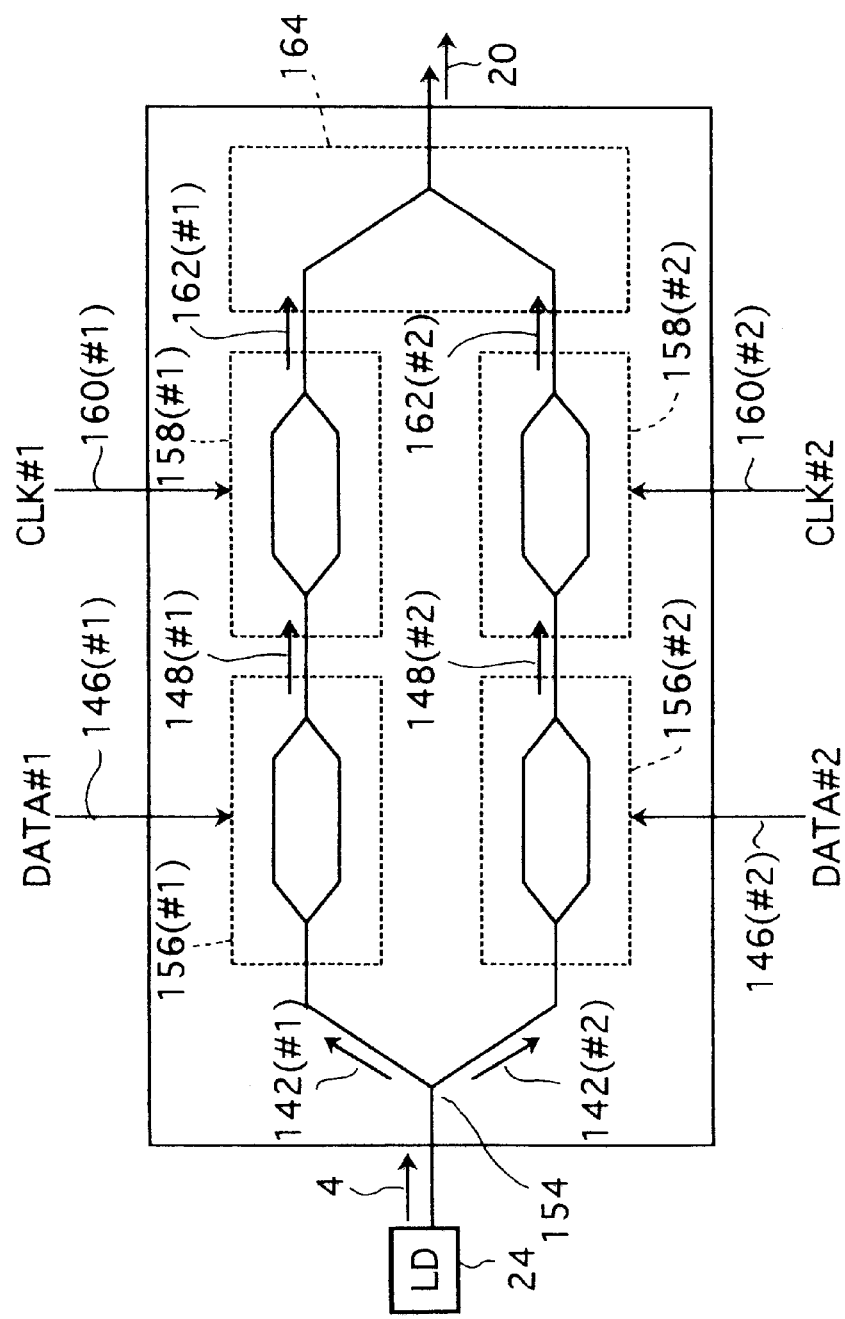
FIG. 21 is a block diagram showing a first preferred embodiment of the second basic configuration.

Referring to FIG. 21, there is shown a first preferred embodiment of the second basic configuration. The carrier beam 4 output from a laser diode 24 as the light source 2 is branched into a first carrier beam 142 (#1) and a second carrier beam 142 (#2) by a Y-branch 154. That is, the Y-branch 154 corresponds to the carrier beam outputting means 140 shown in FIG. 20. An optical modulator 156 (#1) as the first data modulating means 144 (#1) switches on/off the carrier beam 142 (#1) by receiving a first data signal 146 (#1) to thereby generate a first data modulated beam 148 (#1). An optical modulator 156 (#2) as the second data modulating means 144 (#2) switches on/off the carrier beam 142 (#2) by receiving a second data signal 146 (#2) to thereby generate a second data modulated beam 148 (#2). The optical multiplexing means 150 includes an optical modulator 158 (#1) for applying a first clock 160 (#1) as the first optical clock to the first data modulated beam 148 (#1) to thereby generate a first signal beam 162 (#1), an optical modulator 158 (#2) for applying a second clock 160 (#2) as the second optical clock to the second data modulated beam 148 (#2) to thereby generate a second signal beam 162 (#2), and an optical multiplexer 164 for combining the signal beams 162 (#1 and #2) to generate an OTDM signal 20.

An MZ modulator or an EA modulator may be used as each of the optical modulators 156 (#1 and #2) and 158 (#1 and #2). By setting a chirp parameter in the optical modulators 158 (#1 and #2) concerned with the optical clocks like the various preferred embodiments of the first basic configuration, dispersion compensation can be easily carried out.

In this preferred embodiment, the data signals 146 (#1 and #2) are shifted by half bit to each other, and the clocks 160 (#1 and #2) are opposite in phase to each other. In the case of making the bit positions of the data signals 146 (#1 and #2) identical with each other and using the clocks 160 (#1 and #2) having the same phase, the optical delay circuit 94 as shown in FIG. 11 may be preferably provided between the Y-branch 154 and the optical modulator 156 (#1) or between the Y-branch 154 and the optical modulator 156 (#2).

While the single laser diode 24 is used as the light source 2 in this preferred embodiment, two laser diodes 24 (#1 and #2) as shown in FIG. 18 may be used to omit the Y-branch 154.

Figure 22:
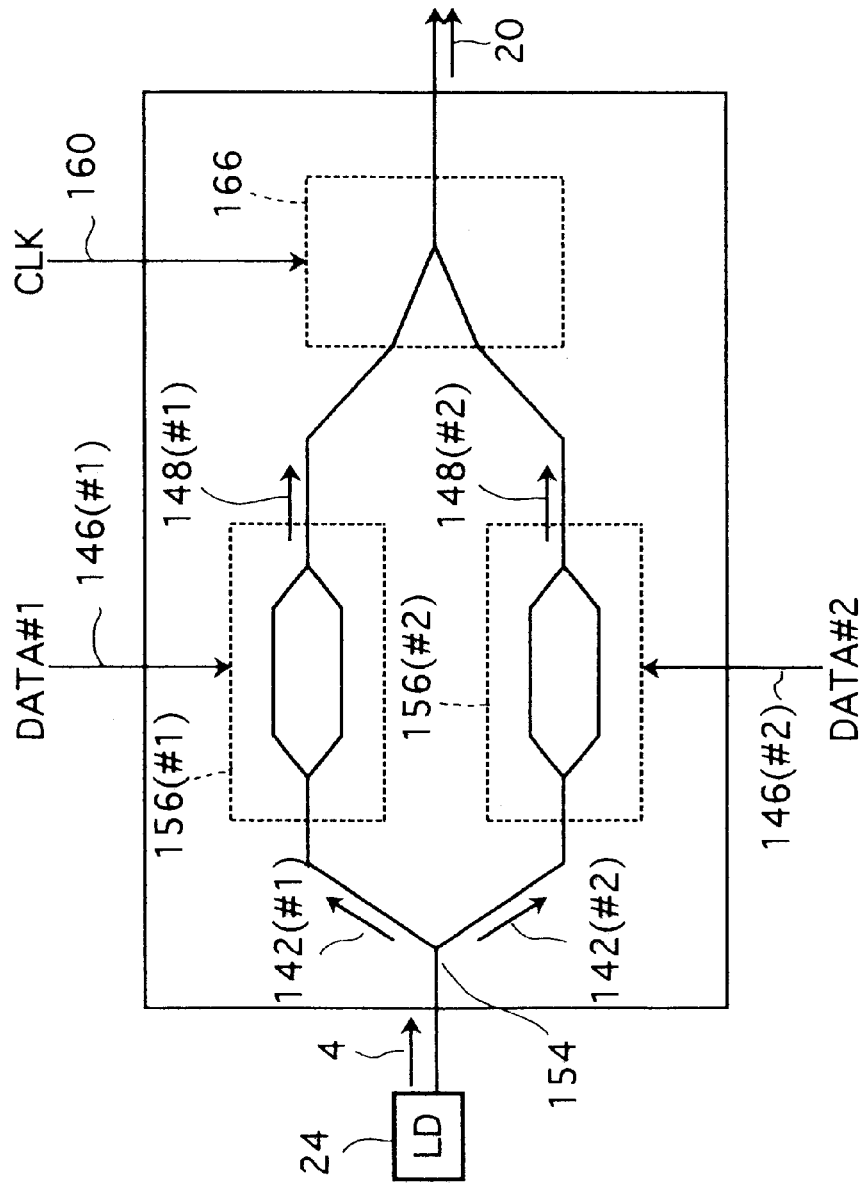
FIG. 22 is a block diagram showing a second preferred embodiment of the second basic configuration.
Figure 27B:
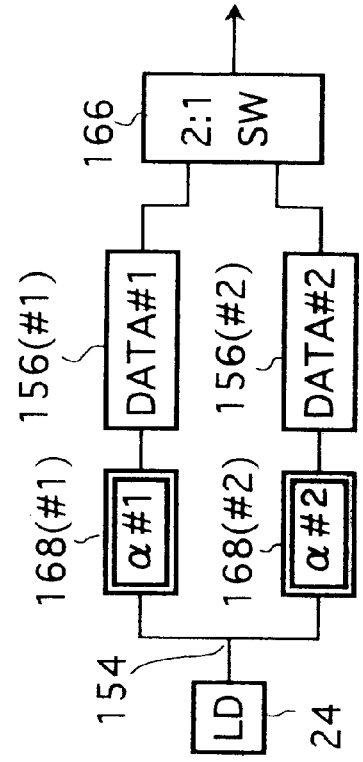
FIGS. 27A to 27D are block diagrams showing various arrangements of a chirping addition circuit applicable in FIG. 22.
Figure 27D:
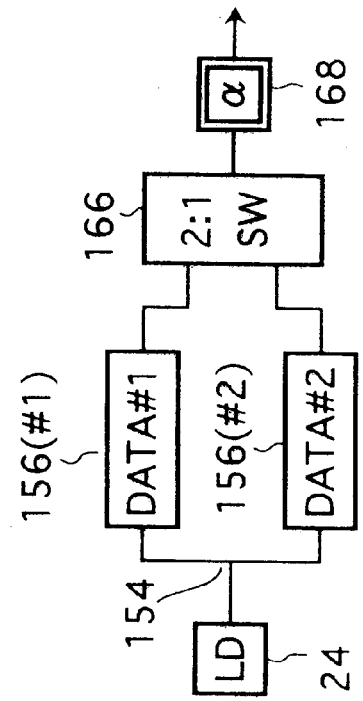
Figure 27A:
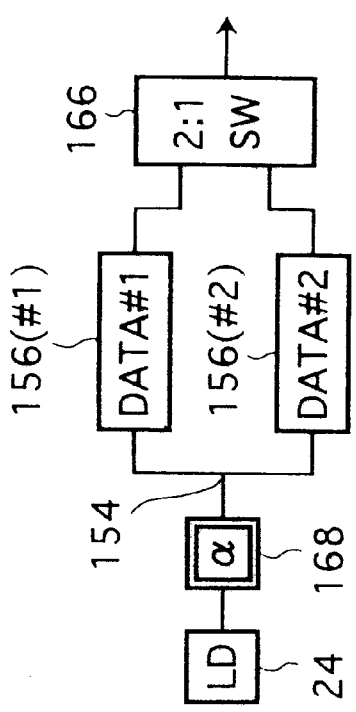
Figure 27C:
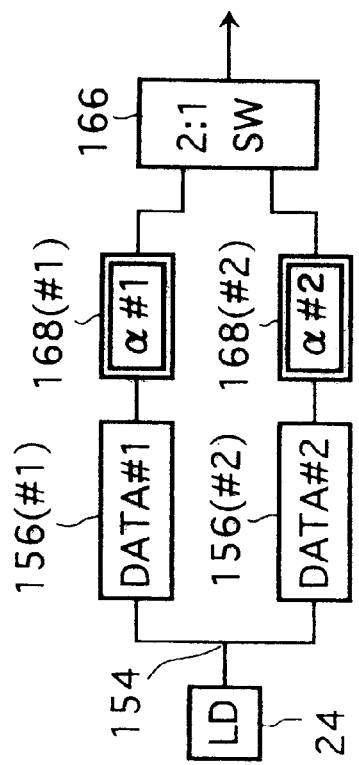

Referring to FIG. 22, there is shown a second preferred embodiment of the second basic configuration. This preferred embodiment is characterized in that the optical multiplexing means 150 (see FIG. 20) includes a 2×1 optical switch 166. Two data modulated beams 148 (#1 and #2) are supplied to two input ports of the optical switch 166, respectively, and an OTDM signal 20 is output from an output port of the optical switch 166. The optical switch 166 switches the two input ports every 1/2 bit of the data signals 146 (#1 and #2) according to a single clock 160, thereby multiplexing the data modulated beams 148 (#1 and #2) on a time axis. In this preferred embodiment, the switching in the optical switch 166 is predominant for the chirp parameter of the OTDM signal 20. Accordingly, the chirp parameter is set preferably in the optical switch 166. The Y-branch 154 may be omitted by using two laser diodes as the light source.

As mentioned above, addition of chirping is allowed by using the electrode 98 for phase modulation as shown in FIG. 12. There will now be described various arrangements of a chirping addition circuit 168 having such a function.

Referring to FIGS. 23A to 23D, there are shown various arrangements of a chirping addition circuit applicable in FIG. 2. In the arrangement shown in FIG. 23A, a chirping addition circuit 168 is provided between the laser diode 24 and the 1×2 optical switch 28. In the arrangement shown in FIG. 23B, a first chirping addition circuit 168 (#1) is provided between the optical switch 28 and the optical modulator 42 (#1), and a second chirping addition circuit 168 (#2) is provided between the optical switch 28 and the optical modulator 42 (#2). In the arrangement shown in FIG. 23C, a first chirping addition circuit 168 (#1) is provided between the optical modulator 42 (#1) and the optical multiplexer 16, and a second chirping addition circuit 168 (#2) is provided between the optical modulator 42 (#2) and the optical multiplexer 16. In the arrangement shown in FIG. 23D, a chirping addition circuit 168 is provided on the output side of the optical multiplexer 16.

Referring to FIGS. 24A to 24E, there are shown various arrangements of a chirping addition circuit applicable in FIG. 11. In the arrangement shown in FIG. 24A, a chirping addition circuit 168 is provided between the laser diode 24 and the optical modulator 82. In the arrangement shown in FIG. 24B, a chirping addition circuit 168 is provided between the optical modulator 82 and the Y-branch 84. In the arrangement shown in FIG. 24C, a first chirping addition circuit 168 (#1) is provided between the Y-branch 84 and the optical modulator 42 (#1), and a second chirping addition circuit 168 (#2) is provided between the Y-branch 84 and the optical modulator 42 (#2). In the arrangement shown in FIG. 24D, a first chirping addition circuit 168 (#1) is provided between the optical modulator 42 (#1) and the optical multiplexer 16, and a second chirping addition circuit 168 (#2) is provided between the optical modulator 42 (#2) and the optical multiplexer 16. In the arrangement shown in FIG. 24E, a chirping addition circuit 168 is provided on the output side of the optical multiplexer 16.

Referring to FIGS. 25A to 25E, there are shown various arrangements of a chirping addition circuit applicable in FIG. 19. In the arrangement shown in FIG. 25A, a chirping addition circuit 168 is provided between the laser diode 24 and the Y-branch 138. In the arrangement shown in FIG. 25B, a first chirping addition circuit 168 (#1) is provided between the Y-branch 138 and the optical modulator 82 (#1), and a second chirping addition circuit 168 (#2) is provided between the Y-branch 138 and the optical modulator 82 (#2). In the arrangement shown in FIG. 25C, a first chirping addition circuit 168 (#1) is provided between the optical modulator 82 (#1) and the optical modulator 42 (#1), and a second chirping addition circuit 168 (#2) is provided between the optical modulator 82 (#2) and the optical modulator 42 (#2). In the arrangement shown in FIG. 25D, a first chirping addition circuit 168 (#1) is provided between the optical modulator 42 (#1) and the optical multiplexer 16, and a second chirping addition circuit 168 (#2) is provided between the optical modulator 42 (#2) and the optical multiplexer 16. In the arrangement shown in FIG. 25E, a chirping addition circuit 168 is provided on the output side of the optical multiplexer 16.

Referring to FIGS. 26A to 26E, there are shown various arrangements of a chirping addition circuit applicable in FIG. 21. In the arrangement shown in FIG. 26A, a chirping addition circuit 168 is provided between the laser diode 24 and the Y-branch 154. In the arrangement shown in FIG. 26B, a first chirping addition circuit 168 (#1) is provided between the Y-branch 154 and the optical modulator 156 (#1), and a second chirping addition circuit 168 (#2) is provided between the Y-branch 154 and the optical modulator 156 (#2). In the arrangement shown in FIG. 26C, a first chirping addition circuit 168 (#1) is provided between the optical modulator 156 (#1) and the optical modulator 158 (#1), and a second chirping addition circuit 168 (#2) is provided between the optical modulator 156 (#2) and the optical modulator 158 (#2). In the arrangement shown in FIG. 26D, a first chirping addition circuit 168 (#1) is provided between the optical modulator 158 (#1) and the optical multiplexer 164, and a second chirping addition circuit 168 (#2) is provided between the optical modulator 158 (#2) and the optical multiplexer 164. In the arrangement shown in FIG. 26E, a chirping addition circuit 168 is provided on the output side of the optical multiplexer 164.

Referring to FIGS. 27A to 27D, there are shown various arrangements of a chirping addition circuit applicable in FIG. 22. In the arrangement shown in FIG. 27A, a chirping addition circuit 168 is provided between the laser diode 24 and the Y-branch 154. In the arrangement shown in FIG. 27B, a first chirping addition circuit 168 (#1) is provided between the Y-branch 154 and the optical modulator 156 (#1), and a second chirping addition circuit 168 (#2) is provided between the Y-branch 154 and the optical modulator 156 (#2). In the arrangement shown in FIG. 27C, a first chirping addition circuit 168 (#1) is provided between the optical modulator 156 (#1) and the 2×1 optical switch 166, and a second chirping addition circuit 168 (#2) is provided between the optical modulator 156 (#2) and the optical switch 166. In the arrangement shown in FIG. 27D, a chirping addition circuit 168 is provided on the output side of the optical switch 166.

Referring to FIG. 28, there is shown a third basic configuration of the optical modulating device according to the present invention. In the first and second basic configurations, 2:1 time division multiplexing is carried out, whereas in the third basic configuration, n:1 time division multiplexing (n is an integer greater than 2) is carried out.

More specifically, clock generating means 6 generates n channels of optical clocks 8 (#1 to #n) according to a carrier beam 4 output from a light source 2. Modulating means 10 (#1 to #n) are provided respectively corresponding to the optical clocks 8 (#1 to #n). The k-th modulating means 10 (#k) (k is an integer satisfying $1 \leq k \leq n$) receives the optical clock 8 (#k) and switches on/off the optical clock 8 (#k) by receiving a k-th data signal 12 (#k) synchronous with the optical clock 8 (#k) to thereby generate a signal beam 14 (#k). Signal beams 14 (#1 to #n) generated from the modulating means 10 (#1 to #n) are time-division multiplexed by an optical multiplexer 16 to generate an OTDM signal 20'.

Prechirp means 22 controls at least one of the carrier beam 4, the optical clocks 8 (#1 to #n), the signal beams 14 (#1 to #n), and the OTDM signal 20' so that the OTDM signal 20' has a predetermined chirp parameter. The chirp parameter of the OTDM signal 20' is set so that the OTDM signal 20' is adapted to an optical transmission line 18.

The duty ratio of the optical clocks 8 (#1 to #n) decreases with an increase in the number (n) of multichannels.

Also in the third basic configuration, the pulse width of each optical clock is smaller than that of each data signal, so that the clock generating means 6 is predominant on the chirp parameter of the OTDM signal 20'. Accordingly, the prechirp means 22 sets the chirp parameter preferably in the clock generating means 6.

While the third basic configuration shown in FIG. 28 is obtained by expanding the number of multichannels in the first basic configuration shown in FIG. 1 to n, the number of multichannels in the second basic configuration shown in FIG. 20 may be expanded to n.

Figure 29:
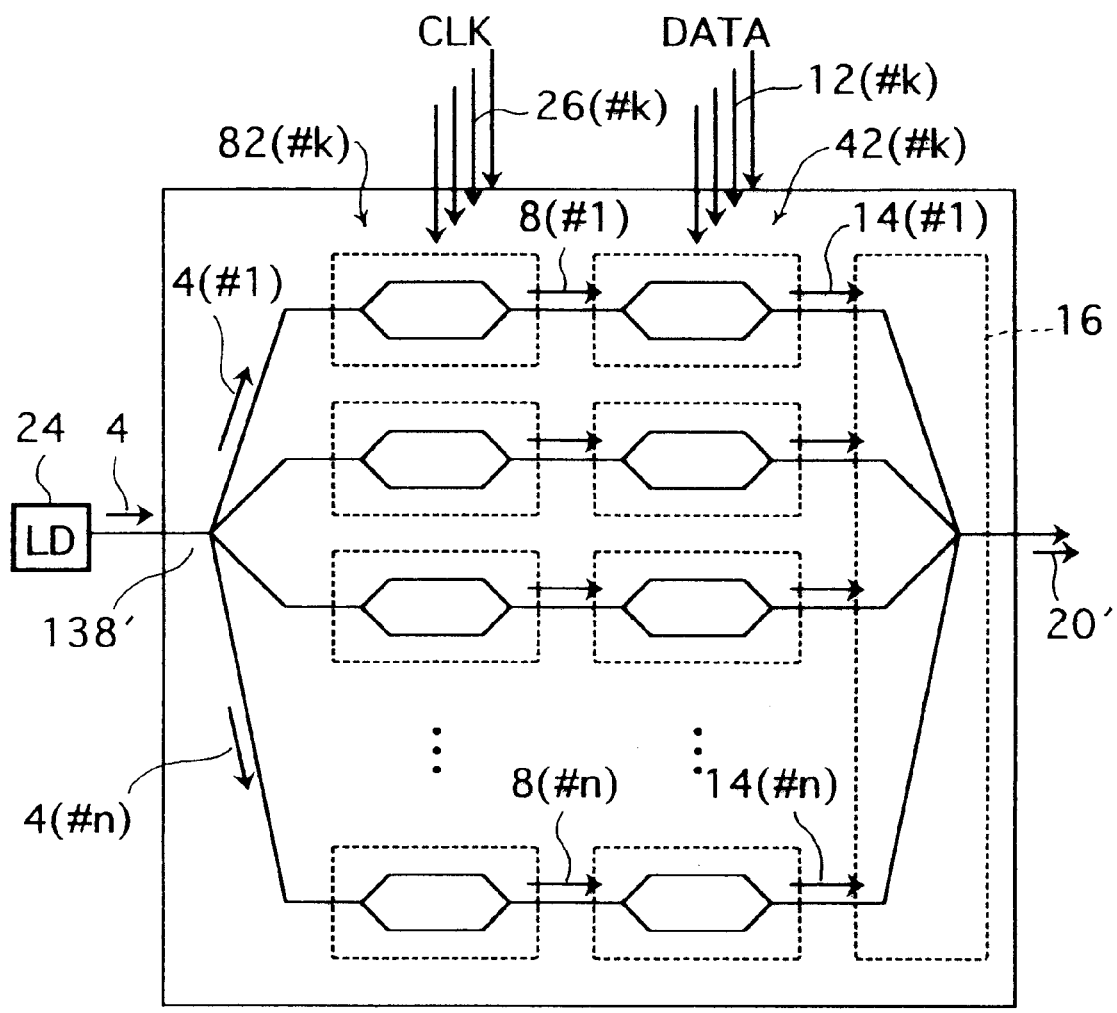
FIG. 29 is a block diagram showing a preferred embodiment of the third basic configuration.

Referring to FIG. 29, there is shown a preferred embodiment of the third basic configuration. This preferred embodiment is obtained by expanding the number of multichannels in the preferred embodiment shown in FIG. 19. That is, a carrier beam 4 output from a laser diode 24 is branched into carrier beams 4 (#1 to #n) by an n-branch 138'. An optical modulator 82 (#k) intensity-modulates the carrier beam 4 (#k) according to a clock 26 (#k) to thereby generate an optical clock 8 (#k). An optical modulator 42 (#k) switches on/off the optical clock 8 (#k) according to a data signal 12 (#k) to thereby generate a signal beam 14 (#k). The signal beams 14 (#1 to #n) are combined together in the optical multiplexer 16, and a resultant OTDM signal 20' is output from the optical multiplexer 16. In this preferred embodiment, the chirp parameter is set in the optical modulators 82 (#1 to #n) relating to the clocks. A drive circuit for setting or the like of the chirp parameter may be configured in accordance with the previous preferred embodiments, so the description thereof will be omitted herein.

Figure 30:
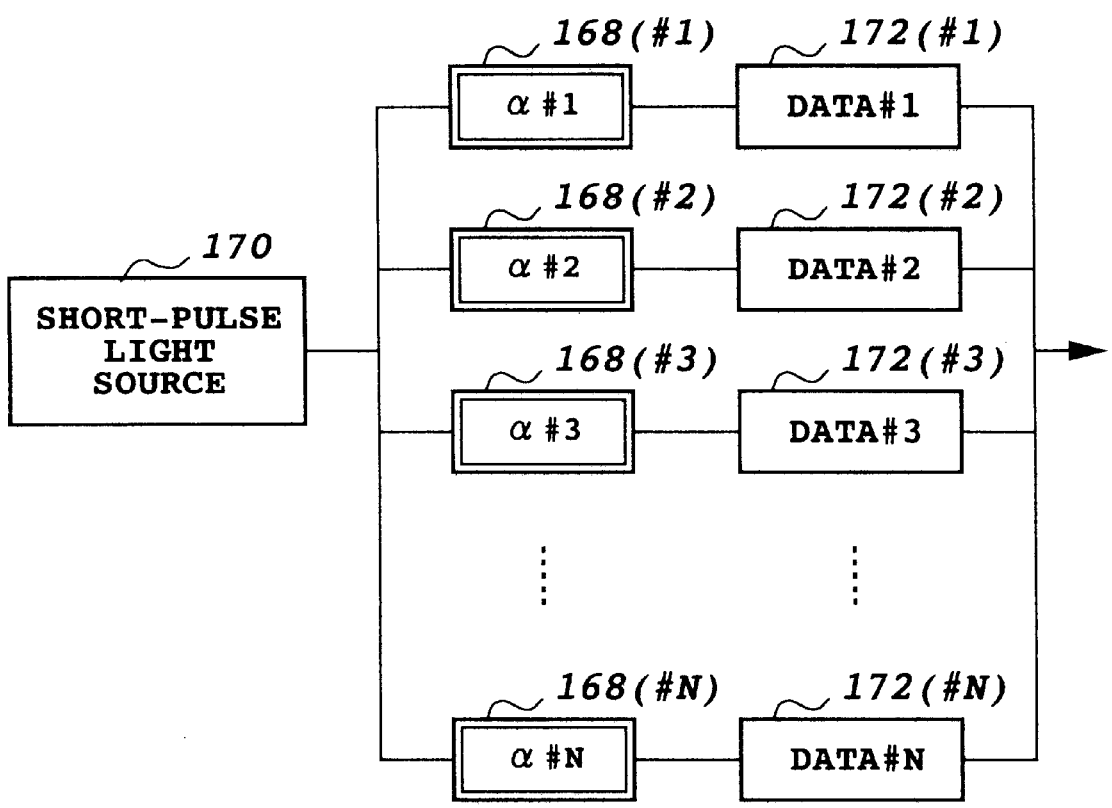
FIG. 30 is a block diagram showing a preferred embodiment employing a short-pulse light source.

Referring to FIG. 30, there is shown a preferred embodiment employing a short-pulse light source 170. By using the short-pulse light source 170, an optical clock can be generated. Accordingly, the clock generating means 6 shown in FIG. 28, for example, can be eliminated. The short-pulse light source 170 is configured by using a mode-locking laser diode or a fiber ring laser, for example, which itself can generate an optical clock. The optical clock generated from the short-pulse light source 170 is N-branched (N is an integer greater than 1), and chirp parameters for the N branched clocks are set by chirp parameter addition circuits 168 (#1 to #N), respectively. Thereafter, the N branched clocks are converted into N channels of signal beams by optical modulators 172 (#1 to #N) receiving data signals. These signal beams are optically multiplexed by an optical multiplexer (not shown) to be output to an optical transmission line (not shown). The chirping addition circuits 168 (#1 to #N) may be provided on the output side of the optical modulators 172 (#1 to #N). Further, one chirping addition circuit rather than the plural chirping addition circuits may be provided on the output side of the short-pulse light source 170 or on the output side of the optical multiplexer.

While the chirp parameter is set in the optical modulating device in the above preferred embodiments, the chirp parameter may be set in the light source to perform prechirping. For example, by directly frequency-modulating the light source and externally modulating an output beam from the light source by a data signal, the frequency components (wavelength components) at a front half part and a rear half part of an optical pulse can be made different from each other.

In the case that a chromatic dispersion of the optical transmission line is preliminarily grasped, an optimum prechirping amount can be set by simulation. If the simulation is difficult, prechirping may be carried out by the following method.

Referring to FIG. 31, there is shown an optical communication system to which the present invention is applicable. This system includes a first terminal 174, a second terminal 176, and an optical transmission line 18 for connecting the terminals 174 and 176. The first terminal 174 has an optical transmitter 178 having the optical modulating device according to the present invention. An OTDM signal output from the optical transmitter 178 is transmitted through an optical coupler 180 to the optical transmission line 18. The OTDM signal transmitted by the optical transmission line 18 is supplied through an optical coupler 182 to an optical receiver 184 in the second terminal 176. A transmission characteristics monitoring circuit 186 monitors transmission characteristics of the OTDM signal according to the OTDM signal received by the optical receiver 184. The second terminal 176 has an optical transmitter 188 for transmitting data on the monitored transmission characteristics. An optical signal output from the optical transmitter 188 is transmitted through the optical coupler 182 to the optical transmission line 18, and the transmitted optical signal is supplied through the optical coupler 180 to an optical receiver 190 in the first terminal 174. A feedback circuit 192 feedback-controls a chirp parameter in the optical transmitter 178 according to the transmission characteristics monitored in the second terminal 176, on the basis of an output signal from the optical receiver 190.

In such a system, an optimum prechirping amount can be automatically set by using a microcomputer or the like to centralizedly control the whole system. Further, not only at a cold start of the system, but also during operating of the system, the transmission characteristics may be monitored and the prechirping amount can be adjusted according to the result of monitoring. Accordingly, it is possible to easily respond to timed changes of the chromatic dispersion of the optical transmission line 18, for example. The transmission characteristics to be monitored may include a bit error rate, Q-value, parity bit check in a signal, transmission waveform (whether or not a required eye mask pattern is satisfied), etc.

In this preferred embodiment, bidirectional transmission is performed by using one optical transmission line 18. In a modification such that there is a backup line substantially the same in dispersion conditions and installation environments as an operating line, optimization of a prechirping amount may be first carried out in the backup line, and then the result may be applied to the operating line. Further, the dispersion of the line may be periodically fed back to a transmitting side by using an electrical line or the like, because the dispersion does not change rapidly. Accordingly, optimization of a prechirping amount is allowed without interruption of service.

As described above, according to the present invention, it is possible to provide an optical modulating device and an optical modulating method which is suitable for high-speed transmission and allows dispersion compensation.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical modulating device comprising:
   clock generating means for generating first and second optical clocks according to a carrier beam from a light source;
   first data modulating means for receiving said first optical clock and switching on/off said first optical clock by a first data signal synchronous with said first optical clock to thereby generate a first signal beam;
   second data modulating means for receiving said second optical clock and switching on/off said second optical clock by a second data signal to thereby generate a second signal beam;
   an optical multiplexer operatively connected to said first and second data modulating means and an optical transmission line, for combining said first and second signal beams to generate an optical time division multiplexed signal; and
   prechirp means for controlling at least one of said carrier beam, said first and second optical clocks, said first and second signal beams, and said optical time division multiplexed signal so that said optical time division multiplexed signal has a chirp parameter adapted to said optical transmission line.

2. An optical modulating device according to claim 1, wherein said first and second optical clocks have pulse widths smaller than those of said first and second data signals.

3. An optical modulating device according to claim 2, wherein said prechirp means controls said first and second optical clocks.

4. An optical modulating device according to claim 2, wherein:
   said first and second optical clocks have sinusoidal waveforms; and
   said first and second data signals are preliminarily NRZ-coded.

5. An optical modulating device according to claim 1, wherein:
   said clock generating means comprises a balanced bridge type 1×2 optical switch;
   said 1×2 optical switch comprising:
      an input port operatively connected to said light source;
      first and second optical paths branched from said input port;
      first and second output port operatively connected to said first and second data modulating means, respectively; and
      a first intersecting type optical coupler provided between said first and second optical paths and said first and second output ports;
   said first and second output ports outputting said first and second optical clocks, respectively;
   said first and second optical clocks being opposite in phase.

6. An optical modulating device according to claim 5, wherein said 1×2 optical switch further comprises an electrode for applying an electric field to at least one of said first and second optical paths;
   said electrode being supplied with a bias voltage;
   said optical modulating device further comprising means for controlling said bias voltage so that an operating point of said 1×2 optical switch is stabilized.

7. An optical modulating device according to claim 6, wherein:
   said operating point has at least two stable points; and
   said prechirp means comprises means for switching said at least two stable points to thereby switch a sign of said chirp parameter.

8. An optical modulating device according to claim 6, wherein:
   said electrode comprises first and second electrodes provided so as to respectively correspond to said first and second optical paths;
   said bias voltage comprises first and second bias voltages corresponding to said first and second electrodes; and
   said prechirp means comprises means for changing a ratio between said first and second bias voltages.

9. An optical modulating device according to claim 8, wherein said first and second bias voltages are controlled so that the ratio therebetween becomes 1:1, thereby controlling said chirp parameter to zero.

10. An optical modulating device according to claim 5, wherein said optical multiplexer comprises a second intersecting type optical coupler operatively connected to said first and second data modulating means.

11. An optical modulating device according to claim 1, wherein:
   said clock generating means comprises an optical modulator for intensity-modulating said carrier beam to output a clock modulated beam, and a Y-branch operatively connected to said optical modulator and said first and second data modulating means, for branching said clock modulated beam into said first and second optical clocks; and
   said optical modulating device further comprises means for delaying any one of said first and second optical clocks so that said first and second optical clocks become opposite in phase.

12. An optical modulating device according to claim 11, wherein:
   said optical modulator comprises a Mach-Zehnder type modulator;
   said Mach-Zehnder type modulator comprising:
      an input port operatively connected to said light source;
      first and second optical paths branched from said input port;
      an output port operatively connected to said first and second optical paths and said Y-branch, for outputting said clock modulated beam; and
      an electrode for applying an electric field to at least one of said first and second optical paths;
      said electrode being supplied with a bias voltage;
      said optical modulating device further comprising means for controlling said bias voltage so that an operating point of said Mach-Zehnder type modulator is stabilized.

13. An optical modulating device according to claim 12, wherein:
   said operating point has at least two stable points; and
   said prechirp means comprises means for switching said at least two stable points to thereby switch a sign of said chirp parameter.

14. An optical modulating device according to claim 12, wherein:
   said electrode comprises first and second electrodes provided so as to respectively correspond to said first and second optical paths;
   said bias voltage comprises first and second bias voltages corresponding to said first and second electrodes; and said prechirp means comprises means for changing a ratio between said first and second bias voltages.

15. An optical modulating device according to claim 14, wherein said first and second bias voltages are controlled so that the ratio therebetween becomes 1:1, thereby controlling said chirp parameter to zero.

16. An optical modulating device according to claim 11, wherein:
said optical modulator comprises an electro-absorbing type modulator;
said electro-absorbing type modulator being supplied with a bias voltage and a clock signal to be superimposed on said bias voltage.

17. An optical modulating device according to claim 16, wherein said prechirp means changes said bias voltage to thereby control said chirp parameter.

18. An optical modulating device according to claim 1, wherein said clock generating means comprises first and second optical modulators for respectively outputting said first and second optical clocks.

19. An optical modulating device according to claim 18, wherein:
said light source comprises first and second laser diodes for respectively outputting first and second carrier beams;
said first and second optical modulators receiving said first and second carrier beams, respectively.

20. An optical modulating device according to claim 18, further comprising means operatively connected to said light source and said first and second optical modulators, for branching said carrier beam into first and second carrier beams;
said first and second carrier beams being supplied to said first and second optical modulators, respectively.

21. An optical modulating device according to claim 18, wherein each of said first and second optical modulators comprises a Mach-Zehnder type modulator.

22. An optical modulating device according to claim 18, wherein each of said first and second optical modulators comprises an electro-absorbing type modulator.

23. An optical modulating device according to claim 1, wherein said prechirp means includes means for adding chirping to at least one of said carrier beam, said first and second optical clocks, said first and second signal beams, and said optical time division multiplexed signal.

24. An optical modulating device according to claim 23, wherein said chirping adding means comprises an optical phase modulator.

25. An optical modulating device according to claim 1, wherein at least two of said clock generating means, said first and second data modulating means, said optical multiplexer, and said prechirp means are monolithically integrated.

26. An optical modulating device comprising:
means for outputting first and second carrier beams according to a carrier beam from a light source;
means for receiving said first carrier beam and switching on/off said first carrier beam by a first data signal to thereby generate a first data modulated beam;
means for receiving said second carrier beam and switching on/off said second carrier beam by a second data signal to thereby generate a second data modulated beam;
optical multiplexing means for applying first and second optical clocks to said first and second data modulated beams, respectively, to generate first and second signal beams and combining said first and second signal beams to generate an optical time division multiplexed signal; and
means for controlling at least one of said carrier beam, said first and second carrier beams, said first and second data modulated beams, said first and second signal beams, and said optical time division multiplexed signal so that said optical time division multiplexed signal has a predetermined chirp parameter.

27. An optical modulating device according to claim 26, wherein said optical multiplexing means comprises a first optical modulator for generating said first optical clock, a second optical modulator for generating said second optical clock, and an optical multiplexer operatively connected to said first and second optical modulators.

28. An optical modulating device according to claim 26, wherein said optical multiplexing means comprises a 2×1 optical switch for receiving said first and second data modulated beams.

29. An optical modulating device comprising:
clock generating means for generating first to n-th (n is an integer greater than 2) optical clocks according to a carrier beam from a light source;
data modulating means for receiving a k-th (k is an integer satisfying 1≦k≦n) optical clock and switching on/off said k-th optical clock by a k-th data signal synchronous with said k-th optical clock to thereby generate a k-th signal beam;
an optical multiplexer operatively connected to said data modulating means and an optical transmission line, for generating an optical time division multiplexed signal according to first to n-th signal beams generated from said data modulating means; and
means for controlling at least one of said carrier beam, said optical clocks, said signal beams, and said optical time division multiplexed signal so that said optical time division multiplexed signal has a chirp parameter adapted to said optical transmission line.

30. An optical modulating method comprising the steps of:
(a) generating first and second optical clocks according to a carrier beam from a light source;
(b) switching on/off said first optical clock by a first data signal synchronous with said first optical clock to thereby generate a first signal beam;
(c) switching on/off said second optical clock by a second data signal synchronous with said second optical clock to thereby generate a second signal beam;
(d) combining said first and second signal beams to generate an optical time division multiplexed signal; and
(e) controlling at least one of said carrier beam, said first and second optical clocks, said first and second signal beams, and said optical time division multiplexed signal so that said optical time division multiplexed signal has a predetermined chirp parameter.

31. An optical modulating method according to claim 30, further comprising the steps of:
(f) transmitting said optical time division multiplexed signal through an optical transmission line;
(g) monitoring transmission characteristics of said optical time division multiplexed signal transmitted; and
(h) feedback controlling said chirp parameter according to said transmission characteristics monitored.

* * * * *